(12) United States Patent
Soldati

(10) Patent No.: US 10,285,132 B2
(45) Date of Patent: May 7, 2019

(54) METHODS AND NETWORK NODES IN A WIRELESS COMMUNICATION NETWORK

(71) Applicant: Huawei Technologies Co., Ltd., Shenzhen (CN)

(72) Inventor: Pablo Soldati, Kista (SE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 235 days.

(21) Appl. No.: 15/270,849

(22) Filed: Sep. 20, 2016

(65) Prior Publication Data

US 2017/0013561 A1    Jan. 12, 2017

Related U.S. Application Data

(63) Continuation of application No. PCT/EP2014/055764, filed on Mar. 21, 2014.

(51) Int. Cl.
*G08C 17/00* (2006.01)
*H04W 52/02* (2009.01)
(Continued)

(52) U.S. Cl.
CPC ... *H04W 52/0261* (2013.01); *H04W 52/0216* (2013.01); *H04W 76/28* (2018.02); *H04W 8/005* (2013.01); *H04W 76/14* (2018.02); *H04W 88/02* (2013.01); *Y02D 70/1226* (2018.01); *Y02D 70/1242* (2018.01); *Y02D 70/1262* (2018.01);
(Continued)

(58) Field of Classification Search
CPC ............. H04W 52/0261; H04W 76/28; H04W 52/0216; H04W 76/14; H04W 8/005; H04W 88/02; Y02D 70/1264; Y02D 70/24; Y02D 70/1226; Y02D 70/146; Y02D 70/00; Y02D 70/1262; Y02D 70/25
See application file for complete search history.

(56) References Cited

U.S. PATENT DOCUMENTS 6,697,617 B2 *   2/2004   Liebenow ......... H04M 1/72519
                                                340/7.32
7,395,097 B2 *   7/2008   Perdomo ............ H04M 1/7253
                                                455/574
(Continued)

FOREIGN PATENT DOCUMENTS

JP      2006520170 A      8/2006
JP      2009505483 A      2/2009
(Continued)

OTHER PUBLICATIONS

"Transmission of an Indication for UE Battery Status," Agenda Item: 6.8.2, Source: HTC Corporation, Document for: Discussion and Decision, 3GPP TSG-RAN WG2 Meeting #68bis, R2-101322, Feb. 22-26, 2010, 3 pages.

*Primary Examiner* — Stephen M D Agosta
(74) *Attorney, Agent, or Firm* — Slater Matsil, LLP

(57) ABSTRACT

Mobile station and method for saving energy in the mobile station. The method includes generating energy saving information associated with said mobile station, and which indicates an energy status of said mobile station. The method further includes transmitting the energy saving information to at least one first network node, and receiving, from said at least one first network node, an instruction for energy saving, based on the energy saving information.

19 Claims, 7 Drawing Sheets

(51) Int. Cl.
*H04W 76/28* (2018.01)
*H04W 8/00* (2009.01)
*H04W 88/02* (2009.01)
*H04W 76/14* (2018.01)

(52) U.S. Cl.
CPC ........ *Y02D 70/1264* (2018.01); *Y02D 70/146* (2018.01); *Y02D 70/24* (2018.01); *Y02D 70/25* (2018.01)

(56) References Cited

U.S. PATENT DOCUMENTS

| | | | |
|---|---|---|---|
| 7,433,702 B2* | 10/2008 | Lindskog | G06F 1/3203 455/522 |
| 2004/0180701 A1 | 9/2004 | Livet et al. | |
| 2005/0018624 A1* | 1/2005 | Meier | H04L 29/12028 370/318 |
| 2005/0143119 A1* | 6/2005 | Chandra | H04W 52/288 455/522 |
| 2007/0057767 A1 | 3/2007 | Sun et al. | |
| 2008/0095091 A1 | 4/2008 | Surineni et al. | |
| 2010/0302980 A1 | 12/2010 | Ji et al. | |
| 2011/0211466 A1 | 9/2011 | Kazmi | |
| 2011/0292852 A1 | 12/2011 | Kone | |
| 2013/0343252 A1 | 12/2013 | Chakraborty et al. | |
| 2014/0003257 A1* | 1/2014 | Chin | H04W 52/0261 370/252 |
| 2015/0111563 A1 | 4/2015 | Zhao et al. | |
| 2016/0316514 A1 | 10/2016 | Zhao et al. | |

FOREIGN PATENT DOCUMENTS

| | | |
|---|---|---|
| JP | 2011510557 A | 3/2011 |
| JP | 2012528511 A | 11/2012 |
| JP | 2013201501 A | 10/2013 |
| JP | 2013201508 A | 10/2013 |
| JP | 2015527837 A | 9/2015 |
| RU | 2421924 C2 | 6/2011 |
| WO | 2006037377 A1 | 4/2006 |
| WO | 2007149732 A1 | 12/2007 |
| WO | 2009091303 A1 | 7/2009 |
| WO | 2014019552 A1 | 2/2014 |

* cited by examiner

METHODS AND NETWORK NODES IN A WIRELESS COMMUNICATION NETWORK

CROSS-REFERENCE TO RELATED APPLICATIONS

This application is a continuation of International Application No. PCT/EP2014/055764, filed on Mar. 21, 2014, the disclosure of which is hereby incorporated by reference in its entirety.

TECHNICAL FIELD

Implementations described herein generally relate to a first network node, a method in a first network node, a mobile station and a method in a mobile station. In particular, a mechanism is herein described, for enabling the mobile station to save energy based on energy status of the mobile station.

BACKGROUND

A mobile station, also known as a User Equipment (UE), wireless terminal and/or mobile terminal is enabled to communicate wirelessly in a wireless communication network, some-times also referred to as a cellular radio system. The communication may be made, e.g., between user equipment, between a user equipment and a wire connected telephone and/or between a user equipment and a server via a Radio Access Network (RAN) and possibly one or more core networks. The wireless communication may comprise various communication services such as voice, messaging, packet data, video, broadcast, etc.

The mobile station may further be referred to as mobile telephone, cellular telephone, computer tablet or laptop with wireless capability, etc. The mobile station in the present context may be, for example, portable, pocket-storable, hand-held, computer-comprised, or vehicle-mounted mobile devices, enabled to communicate voice and/or data, via the radio access network, with another entity, such as another mobile station, a stationary entity or a server.

The wireless communication network covers a geographical area which is divided into cell areas, with each cell area being served by a network node, radio network node or base station, e.g., a Radio Base Station (RBS) or Base Transceiver Station (BTS), which in some networks may be referred to as "eNB", "eNodeB", "NodeB" or "B node", depending on the technology and/or terminology used.

Sometimes, the expression "cell" may be used for denoting the network node itself. However, the cell may also in normal terminology be used for the geographical area where radio coverage is provided by the network node at a base station site. One network node, situated on the base station site, may serve one or several cells. The network nodes may communicate over the air interface operating on radio frequencies with any mobile station within range of the respective network node.

In some radio access networks, several network nodes may be connected, e.g., by land-lines or microwave, to a Radio Network Controller (RNC), e.g., in Universal Mobile Telecommunications System (UMTS). The RNC, also sometimes termed Base Station Controller (BSC), e.g., in GSM, may supervise and coordinate various activities of the plural radio network nodes connected thereto. GSM is an abbreviation for Global System for Mobile Communications (originally: Groupe Spécial Mobile).

In 3rd Generation Partnership Project (3GPP) Long Term Evolution (LTE), network nodes, which may be referred to as eNodeBs or eNBs, may be connected to a gateway, e.g., a radio access gateway, to one or more core networks. LTE is based on the GSM/EDGE and UMTS/HSPA network technologies, increasing the capacity and speed using a different radio interface together with core network improvements.

LTE-Advanced, i.e. LTE Release10 and later releases are set to provide higher bitrates in a cost efficient way and, at the same time, completely fulfil the requirements set by International Telecommunication Union (ITU) for the International Mobile Telecommunications (IMT)-Advanced, also referred to as 4G.

In the present context, the expressions downlink, downstream link or forward link may be used for the transmission path from the network node to the mobile station. The expression uplink, upstream link or reverse link may be used for the transmission path in the opposite direction, i.e., from the mobile station to the network node.

Densification of radio network nodes is expected to lead to the spectral efficiency requirements envisioned for future radio access networks. However studies have showed that a plain network densification would significantly increase the overall energy costs. Therefore, future generations of dense radio access network should be co-designed to be both spectral- and energy-efficient. Energy-efficient solutions are an advantage at the network side, e.g., to reduce running costs, and at the mobile station devices to increase battery lifetime and improve the user experience.

One method to achieve energy saving at the network side, is to enable radio access network nodes to operate in a discontinuous transmission (DTX) mode with a short active period of time, e.g. when there is traffic to be served, followed by a long dormant state (a.k.a. "off-state") with limited transmission and reception capabilities. Future releases of the related art 3GPP Long Term Evolution (LTE) system shall adopt this feature for enhanced small cell operation (i.e., network nodes with a small coverage area), e.g., by dynamically switching on/off network nodes to follow traffic variations or other relevant network statistics.

However, solutions that enable energy saving at the network side may in fact determine higher energy consumption for some of the basic operations of the mobile station. For example, with network nodes enabled to operate in a DTX mode some or all the signals typically transmitted to aid the mobile station detect a network node, synchronize to, and measure the signal strength may either be absent or transmitted only sporadically. Therefore, procedures such as cell search, handover, Radio Resource Management (RRM) measurements, Radio Link Management (RLM) measurements, etc., designed for a system where network nodes are always active can become inefficient when network nodes operate in a DTX mode, thereby incurring in higher energy consumption at the mobile station device.

For instance, the 3GPP LTE-Advanced Rel.12 system shall introduce downlink Discovery Reference Signals (DRS) transmitted by network nodes in the dormant state of a DTX mode to aid and speed up the detection of dormant network nodes at the mobile station. However, the current LTE system design does not provide any means to directly control the energy saving at the mobile station when monitoring network nodes operating in DTX mode, or for other fundamental operations of the mobile station, such as cell-search, handover, RRM measurements, RLM measurements, etc.

Therefore, methods for controlling and/or enabling energy saving at the mobile stations that account for the mobile station's energy status or other energy saving information associated with the mobile station can be beneficial in existing or future radio communication systems.

In a first prior art method for energy saving in a 3GPP LTE-A system, mobile stations may be configured with a Discontinuous Reception (DRX) mode and, in case of High Speed Packet Access (HSPA), a Discontinuous Transmission (DTX) mode for maximizing the battery lifetime. In DRX mode, the mobile station is configured to monitor downlink control signaling in only one subframe per DRX cycle, while sleeping with the receiver circuitry switched off in the remaining subframes.

A drawback of the first prior art method is that the configuration of the DRX mode for a mobile station does not depend on any feedback from the mobile station. It may be beneficial, for instance from a performance point of view, to not apply any DRX for a mobile station with fully loaded battery.

In a second prior art method, a mobile node is enabled to transmit at least one network energy saving information to a network control node associated to a preferred or accepted network energy saving mode, i.e., whether the mobile station accepts to participate in network energy saving and/or how much the mobile station would like to contribute to network energy saving. By collecting information from multiple mobile stations, the network control node can enable network energy saving through one or more transmission schemes, such as discontinuous transmission and/or reception, antenna transmission techniques, e.g., Multiple Input Multiple Output (MIMO) schemes, base station sector switching, multi-hop transmission, radio access technology switching, etc.

A drawback with the second prior art method is that it does not provide, or even aim at providing, any energy saving for the mobile station, but rather on the network side. The feedback from the mobile station is intended to determine a configuration of transmission scheme for network energy saving. The feedback information transmitted by the mobile station rather confirm that the mobile station is willing to participate in network energy saving.

In a third prior art method, network assistance associated to the configuration of Discovery Reference Signals (DRS) is provided by the serving network node to the served mobile station to aid monitoring network nodes operating in DTX mode. Network assistance may include information associated to one or more in the group of: a rough synchronization timing of one or multiple network nodes operating in DTX mode, so as to reduce the effort of the mobile station, for cell detection by avoiding synchronizing to the cells cluster; Physical cell ID (PCI) information to identify the neighboring network nodes in dormant state that the mobile station is required to monitor; type of DRS signal, e.g., time-frequency pattern, antenna port etc.

A drawback of the third prior art method is that the information provided by network assistance aims at improving only the detection probability of the other network nodes operating in DTX mode, not the energy efficiency of said operation. Thus, a mobile station with medium/low battery may be configured with parameters that improve the detection of dormant nodes by persistent monitoring of downlink signals transmitted by network nodes in DTX mode, thereby requiring even higher energy consumption at the mobile station.

In a fourth prior art, network assistance provides timing information associated to the reactivation time of other network nodes operating in DTX mode to be monitored, so as to enable the mobile station determine whether and when to monitor a dormant network node.

A drawback with the fourth prior art is that the network shall maintain a tight control over the mobile station with frequent information updates at the cost of large signaling overhead.

In a fifth prior art, a network node in dormant state encodes timing information associated with its reactivation time within a discovery reference signal, thereby enabling the mobile station to determine whether to continue monitoring the dormant node and perform initial synchronization and measurements (e.g., if the reactivation time is imminent) or resume monitoring the network node at a later time, thus saving energy.

A drawback of the fifth prior art is a potentially high detection complexity at the mobile station due to the number of cases to be tested by, for instance, blind decoding, thereby reducing the energy efficiency of the discovery of dormant network nodes.

Therefore, the cited prior art does not provide an efficient solution to directly control energy saving at the mobile station.

SUMMARY

It is therefore an object to obviate at least some of the above mentioned disadvantages and to save energy at a mobile station within a wireless communication network.

This and other objects are achieved by the features of the appended independent claims. Further implementation forms are apparent from the dependent claims, the description and the figures.

According to a first aspect, a mobile station is provided, and is configured for generating energy saving information associated with the mobile station, which indicates an energy status of the mobile station. The mobile station comprises a processor, configured for generating energy saving information associated with said mobile station, which indicates an energy status of said mobile station. Also, the mobile station comprises a transmitter, configured for transmitting the energy saving information to at least one first network node. Furthermore, the mobile station additionally comprises a receiver, configured for receiving an instruction for energy saving, from said at least one first network node based on the energy saving information.

It is thereby enabled to save energy at the mobile station when the battery level of the mobile station is low and to limit the actions of the mobile station to prioritized actions, such as establishing an emergency call, which may be potentially lifesaving, and to limit or inhibit less urgent actions such as monitoring actions. Thereby battery lifetime between reloads is prolonged for the mobile station.

In a first possible implementation of the mobile station according to the first aspect, the energy saving information may comprise an energy saving configuration associated with at least one operation of the mobile station.

Thereby, the mobile station is enabled to actively impact its own energy saving by selecting a preferred or accepted configuration associated with at least one operation of the mobile station, based on the battery level of the mobile station.

In a second possible implementation of the mobile station according to the first aspect, or the first possible implementation, the energy status of said mobile station may comprise an indication of a battery level of the mobile station.

Thus, the mobile station may provide the energy status of the mobile station to the first network node, in order to enable the first network node to determine an appropriate configuration of the mobile station, based on the energy status of the mobile station, for prolonging battery operational lifetime between recharge.

In a third possible implementation of the mobile station according to the first aspect, or any previous possible implementation, the energy saving configuration may comprise at least one of an energy saving configuration of parameters associated with monitoring of at least one other network node operating in discontinuous transmission mode, which is distinct from the first network node, a configuration of an energy saving mode of the mobile station, particularly to a discontinuous reception mode, a discontinuous transmission mode, a Radio Resource Control idle mode and/or a sleeping mode; a configuration of Radio Resource Management measurements and/or Radio Link Monitoring measurements for the mobile station; an energy saving configuration of another mobile station operation, particularly to cell search, cell detection, random access, monitoring of network nodes, monitoring and/or discovering other mobile stations and/or configuration of a device-to-device operation.

Thereby energy is saved at the mobile station, which may be in particular valuable for the mobile station user when the battery level of the mobile station is low, i.e. below a threshold level.

In a fourth possible implementation of the mobile station according to the first aspect, or any previous possible implementation, the receiver may be further configured for receiving a request for energy saving information of the mobile station, from at least one first network node.

Thus the first network node may invoke energy saving information such as battery level of the mobile station from the mobile station and/or a preferred or accepted energy saving configuration of parameters associated with an operation of the mobile station and thereby control energy management within the cell, not only on the network side but also on the mobile station side, rendering reduced energy consumption.

In a fifth possible implementation of the mobile station according to the first aspect, or any previous possible implementation, the energy saving information may be associated with monitoring of at least one other network node operating in discontinuous transmission mode, which is distinct from the first network node.

Thereby, timely and energy efficient cell detection and monitoring such as signal measurements at the mobile station are assured, when other network nodes in the wireless communication network operates in a low duty cycle discontinuous transmission mode. Further, by enabling a brief but precise periodic monitoring time for the mobile station, distributed to the periodic occasions when the other network node transmits signals, the battery operative time of the mobile station may be prolonged, leading to a potentially enhanced user experience.

In a sixth possible implementation of the mobile station according to the first aspect, or any previous possible implementation, the energy saving information may indicate a request or a trigger for an energy saving configuration for at least one operation of said mobile station and/or a notification that the mobile station has entered an energy saving mode.

An advantage therewith is that the mobile station autonomously may take measures in order to reduce energy consumption is running low.

In a seventh possible implementation of the mobile station according to the first aspect, or any previous possible implementation, the received instruction for energy saving may comprise at least one of: an energy saving configuration of parameters associated with monitoring of at least one other network node operating in discontinuous transmission mode, which is distinct from the first network node; a configuration of an energy saving mode of the mobile station, particularly to a discontinuous reception mode, a discontinuous transmission mode, a Radio Resource Control idle mode and/or a sleeping mode; a configuration of Radio Resource Management measurements and/or Radio Link Monitoring measurements for the mobile station; and an energy saving configuration of another mobile station operation, particularly to cell search, cell detection, random access, monitoring of network nodes, monitoring and/or discovering other mobile stations and/or configuration of a device-to-device operation.

Thus energy is saved at the mobile station by enabling the serving network node to configure appropriate parameters based on the mobile station's information.

According to a second aspect, a method in a mobile station is provided, for saving energy in the mobile station. The method comprises generating energy saving information associated with said mobile station, which indicates an energy status of the mobile station; transmitting the energy saving information to at least one first network node; and receiving an instruction for energy saving, from the at least one first network node, based on the energy saving information.

It is thereby enabled to save energy at the mobile station when the battery level of the mobile station is low and to limit the actions of the mobile station to prioritized actions, such as establishing an emergency call, which may be potentially lifesaving, and to limit or inhibit less urgent actions such as monitoring actions. Thereby battery lifetime between reloads is prolonged for the mobile station.

In a first possible implementation of the method according to the second aspect, the method may comprise receiving a request for energy saving information of the mobile station, from at least one network node.

Thus the first network node may invoke energy saving information such as battery level of the mobile station from the mobile station and/or a preferred or accepted energy saving configuration of parameters associated with an operation of the mobile station and thereby control energy management within the cell, not only on the network side but also on the mobile station side, rendering reduced energy consumption.

In a second possible implementation of the method according to the second aspect, or any previous implementation thereof, the energy saving information may comprise an energy saving configuration associated with at least one operation of the mobile station.

Thereby, the mobile station is enabled to actively impact its own energy saving by selecting a preferred or accepted configuration, based on the battery level of the mobile station.

In a third possible implementation of the method according to the second aspect, or any previous implementation thereof, the energy status of the mobile station may comprise an indication of a battery level of the mobile station.

Thus the mobile station may provide the energy status of the mobile station to the first network node, in order to enable the first network node to determine an appropriate configuration of the mobile station, based on the energy status of the mobile station, for prolonging battery operational lifetime between recharge.

In a fourth possible implementation of the method according to the second aspect, or any previous implementation thereof, the energy-saving configuration may comprise at least one of: an energy saving configuration of parameters associated with monitoring of at least one other network node operating in discontinuous transmission mode, which is distinct from the first network node; a configuration of an energy saving mode of the mobile station, particularly to a discontinuous reception mode, a discontinuous transmission mode, a Radio Resource Control idle mode and/or a sleeping mode; a configuration of Radio Resource Management measurements and/or Radio Link Monitoring measurements for the mobile station; an energy saving configuration of another mobile station operation, particularly to cell search, cell detection, random access, monitoring of network nodes, monitoring and/or discovering other mobile stations and/or configuration of a device-to-device operation.

Thereby energy is saved at the mobile station, which may be in particular valuable for the mobile station user when the battery level of the mobile station is low, i.e. below a threshold level.

In a fifth possible implementation of the method according to the second aspect, or any previous implementation thereof, the energy saving information may be associated with monitoring of at least one other network node operating in discontinuous transmission mode, which is distinct from the first network node.

Thereby, timely and energy-efficient cell detection and monitoring such as signal measurements at the mobile station are assured, when other network nodes in the wireless communication network operates in a low-duty cycle discontinuous transmission mode. Further, by enabling a brief but precise periodic monitoring time for the mobile station, distributed to the periodic occasions when the other network node transmits signals, the battery operative time of the mobile station may be prolonged, leading to a potentially enhanced user experience.

In a sixth possible implementation of the method according to the second aspect, or any previous implementation thereof, the energy saving information may indicate a request or a trigger for an energy saving configuration for at least one operation of said mobile station and/or a notification that the mobile station has entered an energy saving mode.

An advantage therewith is that the mobile station autonomously may take measures in order to reduce energy consumption is running low.

In a seventh possible implementation of the method according to the second aspect, or any previous implementation thereof, the received instruction for energy saving may comprise at least one of: an energy saving configuration of parameters associated with monitoring of at least one other network node operating in discontinuous transmission mode, which is distinct from the first network node; a configuration of an energy saving mode of the mobile station, particularly to a discontinuous reception mode, a discontinuous transmission mode, a Radio Resource Control idle mode and/or a sleeping mode; a configuration of Radio Resource Management measurements and/or Radio Link Monitoring measurements for the mobile station; and an energy saving configuration of another mobile station operation, particularly to cell search, cell detection, random access, monitoring of network nodes, monitoring and/or discovering other mobile stations and/or configuration of a device-to-device operation.

Thus energy is saved at the mobile station by enabling the serving network node to configure appropriate parameters based on the mobile station's information.

According to a further aspect, a computer program comprising program code for performing a method according to the second aspect is provided, for saving energy in the mobile station when the computer program is loaded into a processor of the mobile station.

It is thereby enabled to save energy at the mobile station when the battery level of the mobile station is low and to limit the actions of the mobile station to prioritized actions, such as establishing an emergency call, which may be potentially lifesaving, and to limit or inhibit less urgent actions such as monitoring actions. Thereby battery lifetime between reloads is prolonged for the mobile station.

According to yet an aspect, a computer program product comprising a computer readable storage medium storing program code thereon is provided, for saving energy at a mobile station, wherein the program code comprising instructions for executing a method according to the second aspect, comprising: generating energy saving information associated with said mobile station, which indicates an energy status of the mobile station; transmitting the energy saving information to at least one first network node; and receiving an instruction for energy saving, from the at least one first network node, based on the energy saving information.

It is thereby enabled to save energy at the mobile station when the battery level of the mobile station is low and to limit the actions of the mobile station to prioritized actions, such as establishing an emergency call, which may be potentially lifesaving, and to limit or inhibit less urgent actions such as monitoring actions. Thereby battery lifetime between reloads is prolonged for the mobile station.

According to yet an additional aspect, a first network node is provided, comprising a receiver, configured for receiving energy saving information from a mobile station, which indicates an energy status of said mobile station. The first network node also comprises a processor, configured for generating an instruction for energy saving at the mobile station, based on the received energy saving information. In addition, the first network node also comprises a transmitter, configured for transmitting the instruction for energy saving to the mobile station.

An advantage with this aspect is that energy savings at the mobile station is enabled when the battery level of the mobile station is low. It is thereby possible to limit the actions of the mobile station to prioritized actions, such as establishing an emergency call, which may be potentially lifesaving, and to limit or inhibit less urgent actions such as monitoring actions. Thereby battery lifetime between reloads is prolonged for the mobile station.

In a first possible implementation of the additional aspect comprising a first network node, the transmitter may be further configured for transmitting a request to the mobile station, for energy saving information of the mobile station.

Thus the first network node may invoke energy saving information such as battery level of the mobile station from the mobile station and thereby control energy management within the cell, not only on the network side but also on the mobile station side, rendering reduced energy consumption.

In a second possible implementation of the additional aspect comprising a first network node, or any previous implementation thereof, the energy saving information further may comprise an energy saving configuration associated with at least one operation of said mobile station.

Thereby, the mobile station is enabled to actively impact its own energy saving by selecting a preferred or accepted configuration, based on the battery level of the mobile station and transmit that energy saving information to the first network node.

In a third possible implementation of the additional aspect comprising a first network node, or any previous implementation thereof, the energy status of the mobile station may comprise an indication of a battery level of the mobile station.

Thus the mobile station may provide the energy status of the mobile station to the first network node, in order to enable the first network node to determine an appropriate configuration of the mobile station, based on the energy status of the mobile station, for prolonging battery operational lifetime between recharge.

In a fourth possible implementation of the additional aspect comprising a first network node, or any previous implementation thereof, the energy-saving configuration may comprise at least one of an energy saving configuration of parameters associated with monitoring of at least one other network node operating in discontinuous transmission mode, which is distinct from the first network node, a configuration of an energy saving mode of the mobile station, particularly to a discontinuous reception mode, a discontinuous transmission mode, a Radio Resource Control idle mode and/or a sleeping mode; a configuration of Radio Resource Management measurements and/or Radio Link Monitoring measurements for the mobile station, an energy saving configuration of another mobile station operation, particularly to cell search, cell detection, random access, monitoring of network nodes, monitoring and/or discovering other mobile stations and/or configuration of a device-to-device operation.

Thereby energy is saved at the mobile station, which may be in particular valuable for the mobile station user when the battery level of the mobile station is low, i.e. below a threshold level.

In a fifth possible implementation of the additional aspect comprising a first network node, or any previous implementation thereof, the energy saving information may be associated with monitoring of at least one other network node operating in discontinuous transmission mode, which is distinct from the first network node.

Thereby, timely and energy-efficient cell detection and monitoring such as signal measurements at the mobile station are assured, when other network nodes in the wireless communication network operates in a low-duty cycle discontinuous transmission mode. Further, by enabling a brief but precise periodic monitoring time for the mobile station, distributed to the periodic occasions when the other network node transmits signals, the battery operative time of the mobile station may be prolonged, leading to a potentially enhanced user experience.

In a sixth possible implementation of the additional aspect comprising a first network node, or any previous implementation thereof, the energy saving information may indicate a request or a trigger for an energy saving configuration for at least one operation of said mobile station and/or a notification that the mobile station has entered an energy saving mode.

An advantage therewith is that the mobile station autonomously may take measures in order to reduce energy consumption is running low.

In a seventh possible implementation of the additional aspect comprising a first network node, or any previous implementation thereof, the transmitted instruction for energy saving may comprise at least one of an energy saving configuration of parameters associated with monitoring of at least one other network node operating in discontinuous transmission mode, which is distinct from the first network node; a configuration of an energy saving mode of the mobile station, particularly to a discontinuous reception mode, a discontinuous transmission mode, a Radio Resource Control idle mode and/or a sleeping mode; a configuration of Radio Resource Management measurements and/or Radio Link Monitoring measurements for the mobile station, and an energy saving configuration of another mobile station operation, particularly to cell search, cell detection, random access, monitoring of network nodes, monitoring and/or discovering other mobile stations and/or configuration of a device-to-device operation.

Thus energy is saved at the mobile station by enabling the serving network node to configure appropriate parameters based on the mobile station's information.

According to yet a further aspect, a method in a first network node is provided, for saving energy in the mobile station. The method comprises receiving energy saving information from the mobile station, which indicates an energy status of said mobile station, generating an instruction for energy saving at the mobile station, based on the received energy saving information; and transmitting the generated instruction for energy saving to the mobile station.

It is thereby enabled to save energy at the mobile station when the battery level of the mobile station is low and to limit the actions of the mobile station to prioritized actions, such as establishing an emergency call, which may be potentially lifesaving, and to limit or inhibit less urgent actions such as monitoring actions. Thereby battery lifetime between reloads is prolonged for the mobile station.

In a first possible implementation of the further aspect comprising a method in a first network node, the method may further comprise transmitting, to the mobile station, a request for energy saving information of the mobile station.

Thereby the first network node may invoke energy saving information such as battery level of the mobile station from the mobile station and/or a preferred or accepted energy saving configuration of parameters associated with an operation of the mobile station, and thereby control energy management within the cell, not only on the network side but also on the mobile station side, rendering reduced energy consumption.

In a second possible implementation of the further aspect comprising a method in a first network node, or any previous implementation thereof, the energy saving information further may comprise an energy saving configuration associated with at least one operation of the mobile station.

Thereby, the mobile station is enabled to actively impact its own energy saving by selecting a preferred or accepted configuration, based on the battery level of the mobile station and transmit that energy saving information to the first network node.

In a third possible implementation of the further aspect comprising a method in a first network node, or any previous implementation thereof, the energy status of said mobile station may comprise an indication of a battery level.

Thus the mobile station may provide the energy status of the mobile station to the first network node, in order to enable the first network node to determine an appropriate configuration of the mobile station, based on the energy status of the mobile station, for prolonging battery operational lifetime between recharge.

In a fourth possible implementation of the additional aspect comprising a method in a first network node, or any previous implementation thereof, the energy-saving configuration may comprise at least one of: an energy saving configuration of parameters associated with monitoring of at least one other network node operating in discontinuous transmission mode, which is distinct from the first network node, a configuration of an energy saving mode of the mobile station, particularly to a discontinuous reception mode, a discontinuous transmission mode, a Radio Resource Control idle mode and/or a sleeping mode, a configuration of Radio Resource Management measurements and/or Radio Link Monitoring measurements for the mobile station, an energy saving configuration of another mobile station operation, particularly to cell search, cell detection, random access, monitoring of network nodes, monitoring and/or discovering other mobile stations and/or configuration of a device-to-device operation.

Thereby energy is saved at the mobile station, which may be in particular valuable for the mobile station user when the battery level of the mobile station is low, i.e. below a threshold level.

In a fifth possible implementation of the additional aspect comprising a method in a first network node, or any previous implementation thereof, the energy saving information may be associated with monitoring of at least one other network node operating in discontinuous transmission mode, which is distinct from the first network node.

Thereby, timely and energy-efficient cell detection and monitoring such as signal measurements at the mobile station are assured, when other network nodes in the wireless communication network operates in a low-duty cycle discontinuous transmission mode. Further, by enabling a brief but precise periodic monitoring time for the mobile station, distributed to the periodic occasions when the other network node transmits signals, the battery operative time of the mobile station may be prolonged, leading to a potentially enhanced user experience.

In a sixth possible implementation of the additional aspect comprising a method in a first network node, or any previous implementation thereof, the energy saving information may indicate a request or a trigger for an energy saving configuration for at least one operation of said mobile station and/or a notification that the mobile station has entered an energy saving mode.

An advantage therewith is that the mobile station autonomously may take measures in order to reduce energy consumption when battery is running low.

In a seventh possible implementation of the additional aspect comprising a method in a first network node, or any previous implementation thereof, the transmitted instruction for energy saving may comprise at least one of: an energy saving configuration of parameters associated with monitoring of at least one other network node operating in discontinuous transmission mode, which is distinct from the first network node, a configuration of an energy saving mode of the mobile station, particularly to a discontinuous reception mode, a discontinuous transmission mode, a Radio Resource Control idle mode and/or a sleeping mode, a configuration of Radio Resource Management measurements and/or Radio Link Monitoring measurements for the mobile station, and an energy saving configuration of another mobile station operation, particularly to cell search, cell detection, random access, monitoring of network nodes, monitoring and/or discovering other mobile stations and/or configuration of a device-to-device operation.

Thus energy is saved at the mobile station by enabling the serving network node to configure appropriate parameters based on the mobile station's information.

According to another further aspect, a computer program comprising program code for performing a method in the first network node is provided, for saving energy in the mobile station when the computer program is loaded into a processor of the first network node.

It is thereby enabled to save energy at the mobile station when the battery level of the mobile station is low and to limit the actions of the mobile station to prioritized actions, such as establishing an emergency call, which may be potentially lifesaving, and to limit or inhibit less urgent actions such as monitoring actions. Thereby battery lifetime between reloads is prolonged for the mobile station.

According to yet an aspect, a computer program product comprising a computer readable storage medium storing program code thereon is provided, for saving energy at a mobile station, wherein the program code comprising instructions for executing a method in the first network node, including receiving, from the mobile station, energy saving information which indicates an energy status of said mobile station, generating an instruction for energy saving at the mobile station, based on the received energy saving information, and transmitting the generated instruction for energy saving to the mobile station.

It is thereby enabled to save energy at the mobile station when the battery level of the mobile station is low and to limit the actions of the mobile station to prioritized actions, such as establishing an emergency call, which may be potentially lifesaving, and to limit or inhibit less urgent actions such as monitoring actions. Thereby battery lifetime between reloads is prolonged for the mobile station.

Thereby, energy is saved at the mobile station, which may prolong the battery activity time between recharge. Also, the reduced signaling within the communication system generates less interference within the system. Thereby an improved performance within the wireless communication network is provided.

Other objects, advantages and novel features of the described aspects will become apparent from the following detailed description.

BRIEF DESCRIPTION OF THE DRAWINGS

Various embodiments are described in more detail with reference to attached drawings, illustrating different examples of embodiments in which.

DETAILED DESCRIPTION OF ILLUSTRATIVE EMBODIMENTS

Embodiments of the invention described herein are defined as a first network node, a method in a first network node, a mobile station and a method in a mobile station, which may be put into practice in the embodiments described below. These embodiments may, however, be exemplified and realized in many different forms and are not to be limited to the examples set forth herein; rather, these illustrative examples of embodiments are provided so that this disclosure will be thorough and complete.

Still other objects and features may become apparent from the following detailed description, considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 1:
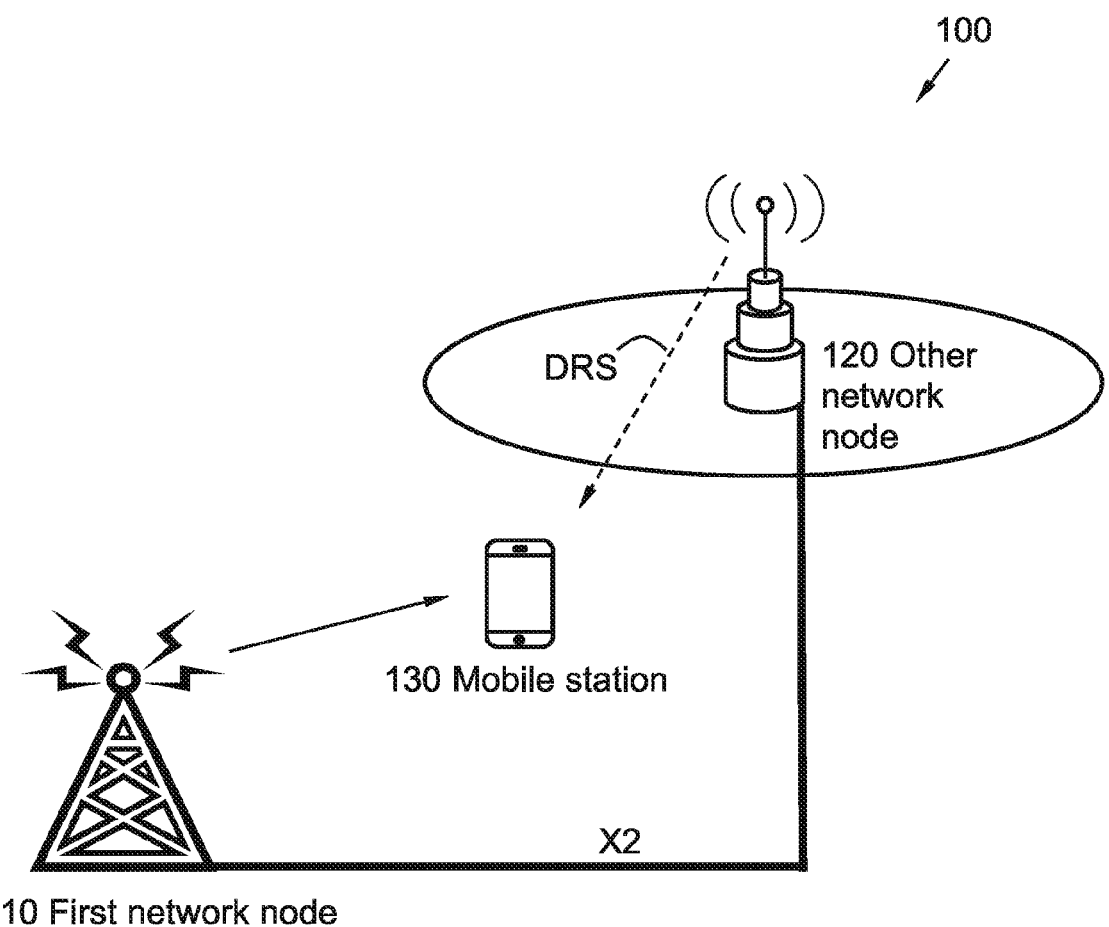
FIG. 1 is a block diagram illustrating a wireless communication network according to some embodiments.

FIG. 1 is a schematic illustration over a wireless communication system 100 comprising a first network node 110, another network node 120 operating in DTX mode and a mobile station 130. The mobile station 130 may be served by the first network node 110, thereby being connected to the wireless communication system 100.

The wireless communication system 100 may at least partly be based on radio access technologies such as, e.g., 3GPP LTE, LTE-Advanced, Evolved Universal Terrestrial Radio Access Network (E-UTRAN), Universal Mobile Telecommunications System (UMTS), Global System for Mobile Communications (originally: Groupe Special Mobile) (GSM)/Enhanced Data rate for GSM Evolution (GSM/EDGE), Wideband Code Division Multiple Access (WCDMA), Time Division Multiple Access (TDMA) networks, Frequency Division Multiple Access (FDMA) networks, Orthogonal FDMA (OFDMA) networks, Single-Carrier FDMA (SC-FDMA) networks, Worldwide Interoperability for Microwave Access (WiMax), or Ultra Mobile Broadband (UMB), High Speed Packet Access (HSPA) Evolved Universal Terrestrial Radio Access (E-UTRA), Universal Terrestrial Radio Access (UTRA), GSM EDGE Radio Access Network (GERAN), 3GPP2 CDMA technologies, e.g., CDMA2000 ix RTT and High Rate Packet Data (HRPD), just to mention some few options. The expressions "wireless communication network", "wireless communication system" and/or "cellular telecommunication system" may within the technological context of this disclosure some-times be utilized interchangeably.

The wireless communication system 100 may be configured to operate according to the Time Division Duplex (TDD) and/or the Frequency Division Duplex (FDD) principle, according to different embodiments.

TDD is an application of time-division multiplexing to separate uplink and downlink signals in time, possibly with a Guard Period (GP) situated in the time domain between the uplink and downlink signaling. FDD means that the transmitter and receiver operate at different carrier frequencies.

The purpose of the illustration in FIG. 1 is to provide a simplified, general overview of the wireless communication system 100 and the involved methods and nodes, such as the first network node no, the other network node 120 and the mobile station 130 herein described, and the functionalities involved. The methods, network nodes 110, 120, and mobile station 130 will subsequently, as a non-limiting example, be described in a 3GPP LTE/LTE-Advanced environment. However the disclosed embodiments may operate in a wireless communication system 100 based on another access technology such as, e.g., any of the above already enumerated. Thus, although the embodiments of the invention are described based on, and using the lingo of, 3GPP LTE systems, it is by no means limited to 3GPP LTE. Further, the terms radio access network node, network node, base station, and cell are used interchangeably in the sequel.

The illustrated first network node no comprised in the wireless communication system 100 may send and receive radio signals in order to communicate wirelessly with the mobile station 130. The other network node 120 is operating in discontinuous transmission mode and may sporadically and/or periodically transmit Discovery Reference Signals (DRS). The periodicity of such signals may be constant, irregular or having a constant increase/decrease over time in different embodiments.

Embodiments described herein aims at controlling and enabling energy savings at the mobile station 130, based on the energy saving information associated with the mobile station 130. The energy saving information may indicate an energy status of said mobile station 130, such as remaining battery power, and/or energy saving information associated with at least one operation of the mobile station 130.

Further, some embodiments are directed towards energy saving at the mobile station when performing operations associated with monitoring of other network nodes 120 operating in DTX mode, comprising detection, RRM/RLM measurements, and measurement reporting.

Further, some embodiments are concerned with assisting the mobile station 130 to operate in an energy efficient way, in the wireless communication network 100. It is a further object of some embodiments to control energy saving at the mobile station 130 when monitoring other network nodes 120 operating in a dormant state of a DTX mode.

Some embodiments comprise a method in the mobile station 130 and a corresponding method in the first network node 110 for enabling energy saving at the mobile station 130. The mentioned two method embodiments together form a method embodiment in a wireless communication system comprising transmitting, by the mobile station 130, at least one energy saving information associated with the mobile station 130 to at least one first network node 110, wherein the energy saving information indicates an energy status associated with the mobile station 130 and/or an energy saving information associated with at least one operation of the mobile station 130. Further, when the at least one first network node 110 receives the transmitted at least one energy saving information associated with the mobile station 130, the first network node 110 is enabled to control energy saving for at least one operation of the mobile station 130 based on the at least one energy saving information.

Thus a method in a mobile station is provided, for transmitting information associated with energy saving of the mobile station 130 to at least one first network node 110, wherein said energy saving information indicates an energy status associated with said mobile station 130 and/or an energy saving configuration of parameters associated with at least one operation of the mobile station 130.

Further a corresponding method in the first network node no is provided for controlling and/or enabling energy saving at the mobile station 130. Such method may comprise receiving, at least one energy saving information associated with the mobile station 130; and controlling energy saving for at least one operation of said mobile station 130 by using the at least one energy saving information.

The energy saving information transmitted by the mobile station 130 may in some embodiments comprise one or more of an indication of energy status associated with the mobile station 130; a request for an energy saving configuration; a request for energy saving configuration associated with at least one operation of the mobile station 130, an indication of a preferred or accepted configuration of parameters associated with at least one operation of the mobile station 130. Furthermore, the energy saving information transmitted by the mobile station 130 may be associated with one or more operations of cell search procedure; monitoring of other network nodes 120, such as detecting and measuring downlink reference signals transmitted by other network nodes 120, random access procedure; relaying operation; device-to-device operations, such as monitoring and/or discovering other mobile stations, measuring reference signals transmitted by other mobile stations, synchronizing with other mobile stations, communicating with other mobile stations.

Similarly, the first network node no receiving such energy saving information from the mobile station 130 may control at least one operation of said mobile station 130 based on said at least one energy saving information. This implies transmitting a set of instructions for energy savings to the mobile station 130 comprising configuration parameters associated with one or more operations of the mobile station 130 of cell search, random access, monitoring downlink signals transmitted by other network nodes 120, monitoring signals transmitted by other mobile stations; RRM/RLM measurements of signals transmitted by other network nodes 120 and/or other mobile stations, synchronization with other mobile stations, relaying operation; device-to-device operations, such as monitoring and/or discovering other mobile stations, measuring reference signals transmitted by other mobile stations, synchronizing with other mobile stations, communicating with other mobile stations.

Thus, the mobile station 130 is enabled to actively impact its own energy saving by enabling at least one first network (control) node no to properly control and/or configure at least one operation of the mobile node 130 based on the energy saving information.

It is to be noted that the illustrated network setting of one instance of the first network node no, one instance of the other network node 120 and one mobile station 130 in FIG. 1 is to be regarded as a non-limiting example of an embodiment only. The wireless communication network 100 may comprise any other number and/or combination of the discussed network nodes 110, 120 and/or mobile stations 130. A plurality of mobile stations 130 and another configuration of network nodes 110, 120 may thus be involved in some embodiments of the disclosed invention. When reference is made herein to "the other network node 120", the at least one other network node 120 may comprise a set of a plurality of other network nodes, according to some embodiments.

Thus whenever "one" or "a/an" first network node no, other network node 120 and/or mobile station 130 is referred to in the present context, a plurality of the first network node no, and/or other network nodes 120 and/or mobile stations 130 may be involved, according to some embodiments.

Further, the first network node no and the other network node 120, according to some embodiments, may be configured for downlink transmission and uplink reception, and may be referred to, respectively, as e.g., a base station, a NodeB, an evolved Node Bs (eNB, or eNode B), a base transceiver station, an Access Point Base Station, a base station router, a Radio Base Station (RBS), a micro base station, a pico base station, a femto base station, a Home eNodeB, a sensor, a beacon device, a relay node, a repeater or any other network node configured for communication with the mobile station 130 over a wireless interface, depending, e.g., of the radio access technology and/or terminology used.

The mobile station 130 may correspondingly be represented by, e.g. a wireless communication terminal, a mobile cellular phone, a Personal Digital Assistant (PDA), a wireless platform, a user equipment, a tablet computer, a portable communication device, a lap-top, a computer, a wireless terminal acting as a relay, a relay node, a mobile relay, a Customer Premises Equipment (CPE), a Fixed Wireless Access (FWA) nodes or any other kind of device configured to communicate wirelessly with the first network node no and/or the other network node 120, according to different embodiments and different vocabulary.

Some embodiments of the invention may define a modular implementation approach, and make it possible to reuse legacy systems such as e.g. standards, algorithms, implementations, components and products.

Figure 2:
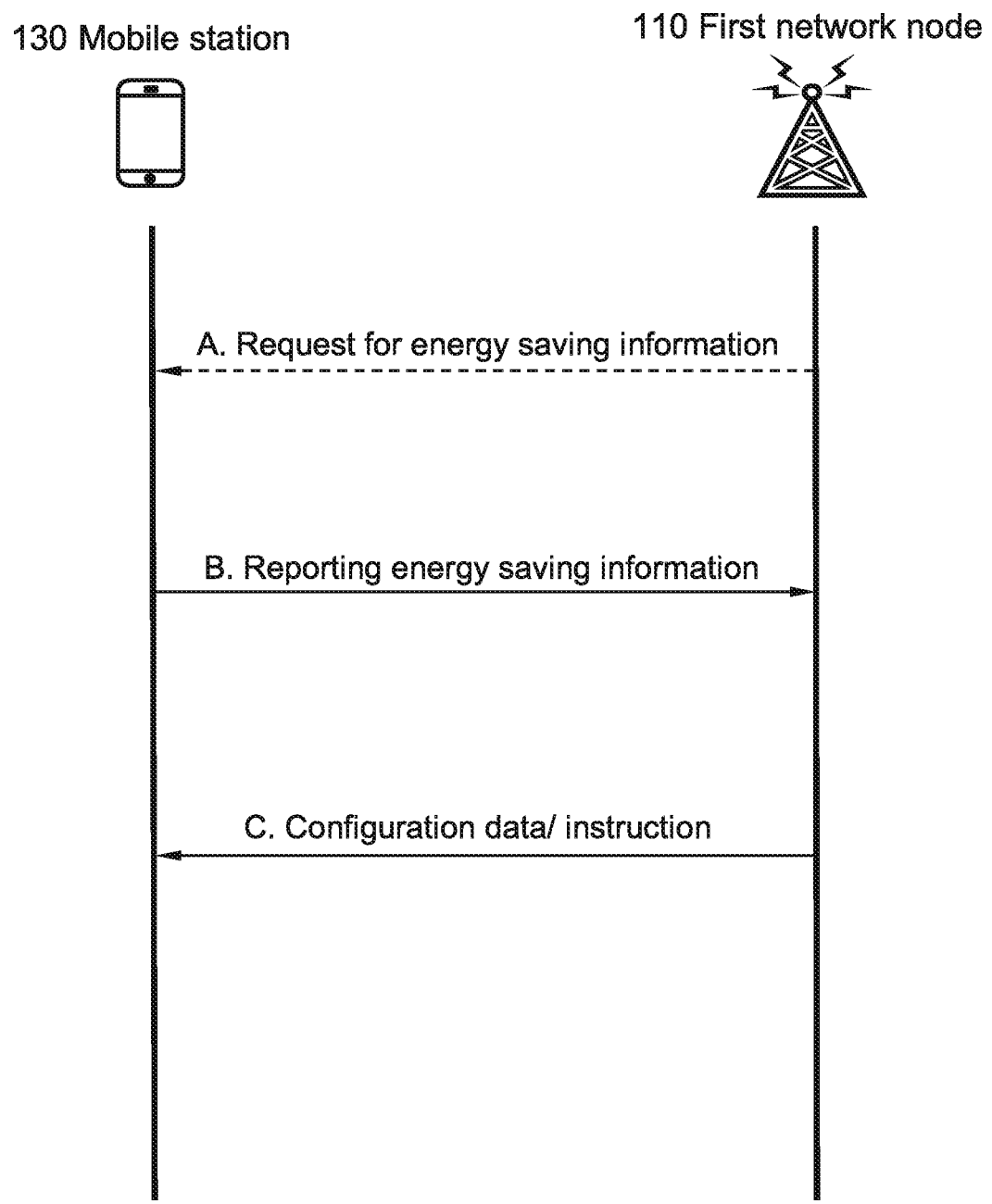
FIG. 2 is a block diagram illustrating communication between a first network node and a mobile station, according to some embodiments.

FIG. 2 illustrates an embodiment of the method, optionally comprising an action A, transmitting, by at least one first network node no, a request for at least some energy saving information to at least one mobile station 130. The request for energy saving information can be associated with a specific operation of the mobile station 130 and/or with an energy status of the mobile station 130. The request may comprise at least one bit in a Downlink Control Information (DCI) format instructing the mobile station 130 to report at least one energy saving information. The request can be transmitted in a mobile station specific manner, i.e., a request addressing a single mobile station, or in a mobile station group common manner, i.e., a request addressing a group or all mobile stations in the system 100. Hence, the request can be transmitted in a downlink control channel, such as the Physical Downlink Control Channel (PDCCH) or Enhanced Physical Downlink Control Channel (EPDCCH) in the LTE system, using a common search space or mobile station specific search space. Also, the signal may be transmitted by using physical downlink shared channel, such as PDSCH; or higher layer RRC signaling in some embodiments. The mobile station 130 may then receive the request for at least some energy saving information. Thereby, this embodiment enables the first network node no to trigger the transmission of energy saving information from the at least one mobile station 130 in order to configure energy saving operation of said mobile station 130 accordingly.

Further, in an action B, the mobile station 130 reports energy saving information to the first network node no. The energy saving information may comprise an indication of remaining battery power of the mobile station 130 in some embodiments. In some other embodiments, the mobile station 130 may make a scanning of the battery power and, based on the result, select a preferred or accepted energy saving configuration associated with one or more operations of the mobile station 130. Further the energy saving information may comprise an implicit indication of remaining battery power of the mobile station 130 in some embodiments, such that the mobile station 130 desire to enter an energy saving mode, a stationary mode or similar, wherein less frequent, or even no monitoring at all may be made. Such battery power scanning may be made continuously by the mobile station 130, or at a predetermined or configurable interval in some embodiments. In some embodiments, the battery power level may be scanned when invoked by the first network node no.

The first network node no, upon receiving the energy saving information from the mobile station 130, may prepare configuration data, or an instruction for the mobile station 130, based on the received energy saving information. Low remaining battery power of the mobile station 130 may render a configuration which is less energy demanding than otherwise, such as enabling less frequent monitoring, disabling monitoring operation, etc.

Finally, the first network node no may transmit the configuration, or instruction as it may be, to the mobile station 130, which in turn may operate accordingly.

Figure 3:
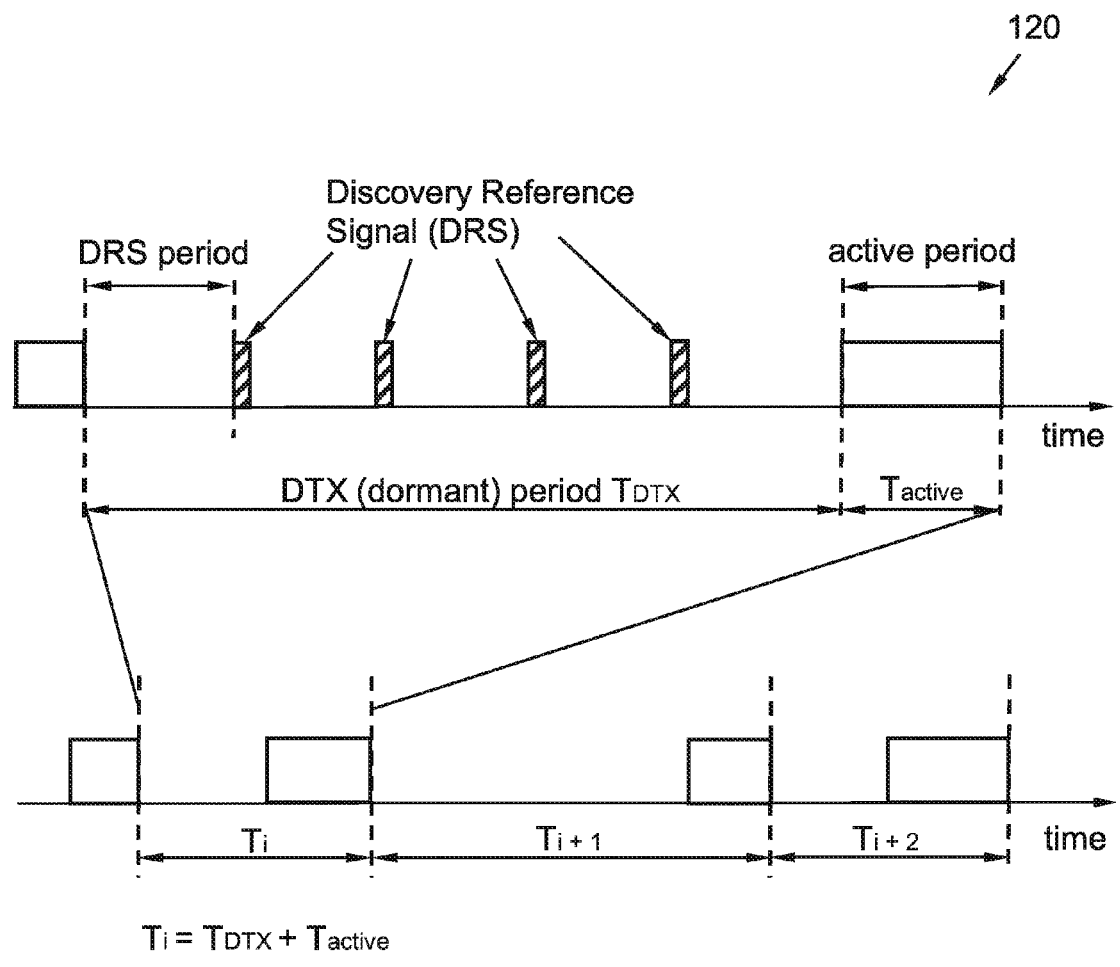
FIG. 3 is a block diagram illustrating another network node operating in DTX mode, transmitting DRS in periodic bursts.

FIG. 3 illustrates active periods, dormant periods and some signaling made by another network node 120 operating in DTX mode.

The other network node 120 is enabled to operate in a discontinuous transmission mode (DTX) comprising a dormant period (a.k.a. "off-state") with limited transmission/reception capabilities, followed by an active period as illustrated in FIG. 3. During the dormant period, the other network node 120 may be enabled to transmit downlink reference signals, a.k.a. Discovery Reference Signals (DRS) intended to aid mobile stations 130 to detect the presence of the dormant node 120 and perform RRM measurements. Without loss of generality, it is here assumed that DRS are transmitted in short bursts of N ms, with a period of Mms, where N and M are arbitrary numbers and N≤M. The DRS signals transmitted by different network nodes 120 can further be time-multiplexed by an offset of Q ms. With respect to the terminology used in the related art LTE system, the quantities N, M, and Q can equivalently be expressed in terms of time slots (e.g., of duration 0.5 ms), subframes (e.g., of duration 1 ms), radio frames (e.g., of duration 10 ms), or any arbitrary combination thereof.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

In some embodiments, the first network node no may be the serving network node for the mobile station 130, while the other network node 120 may be a neighboring node to which the mobile station 130 could be offloaded or handed over. With respect to the related art LTE system, the first network node no may be a primary cell (PCell) providing network assistance to the mobile station 130 (e.g., a macro-eNodeB), while the other network node 120 may be a secondary cell (SCell) such as a pico-eNodeB or a small cell node. The first network node no may further be a small cell node coordinating the operation of a cluster of small cell nodes, in some embodiments.

In an embodiment, the energy saving information transmitted by the mobile station 130 may be associated with a monitoring operation of at least one other network node 120 operating in DTX mode, which is distinct from the first network node no. The energy saving information may indicate an energy status of the mobile station 130 and/or a preferred or an accepted energy saving configuration of parameters associated with monitoring at least one other network node 120 operating in DTX mode. The configuration of parameters for monitoring the at least one other network node 120 operating in DTX mode can be associated with when, and/or how frequently and/or for how long time the monitoring operation is to be configured for. In some embodiments, the monitoring may even be inhibited, e.g. for a certain period of time.

Measurements of signals transmitted by the other network node 120 in DTX mode may comprise one or more in the group of: Reference Signal Received Power (RSRP), Reference Signal Received Quality (RSRQ), Received Signal Strength Indicator (RSSI), Channel State Information (CSI), Channel Quality Indicators (CQI), Signal to Noise and Interference Ratio (SINR), Signal to Noise Ratio (SNR), Signal to Interference Ratio (SIR), or any other appropriate measurement reflecting the strength and/or quality of a signal, and/or a ratio between a certain desired signal and undesired interference or noise. Thereby, the first network node no may trigger the monitoring operation of a mobile station 130 associated to at least other network node 120, operating in DTX mode.

The configuration parameters can further be associated with a time gap between measurements, such as a measurement gap length and/or measurement gap repetition time. The configuration parameters may further be associated with which and/or how many network nodes 110, 120 the mobile station 130 shall be configured to monitor. Therefore, an advantage of this embodiment is to enable the first network node no to configure at least some parameters for the mobile station 130, in order to monitor at least one other network node 120 operating in DTX mode, based at least on an energy saving information received from said mobile station 130.

An advantage of the described embodiment is to reduce the processing effort of the mobile station 130 to detect the presence of and/or perform RRM/RLM measurements from any other network node 120 that operates in DTX mode. Thereby more processing capacity of the mobile station 130 may be free to utilize for other tasks. A further advantage is to enable energy savings at the mobile station 130 by allowing shortening the cell detection of dormant network nodes 120 and by avoiding unnecessary RRM/RLM measurements. This is important as battery operating time is critical for the mobile station 130, as for most portable electronic equipment, due to user demands of high portability/slim design, which put a limit on battery size and thereby also battery capacity of the mobile station 130. Reducing energy consumption at the mobile station side according to the disclosed embodiment thus extends the operating time of the mobile station 130, without losing any functionality.

In yet an embodiment, the mobile station 130 may be preconfigured with different sets of parameters associated with monitoring at least one other network node 120 operating in DTX mode. Thus, the energy saving information transmitted by said mobile station 130 may indicate at least one preferred or accepted parameter among the preconfigured parameters. The preconfigured parameters may comprise one or more of: a monitoring window, a monitoring periodicity, a set of candidate network nodes to be monitored, a measurement gap length, a measurement gap repetition time, etc. Therefore, the mobile node 130 may indicate a preferred or accepted monitoring time window (i.e., for how long to monitor), and/or monitoring period (i.e., how often to periodically monitor), and/or the number of other network nodes 120 to monitor, and/or measurement gap length, and/or measurement gap repetition time, based on current energy status of the mobile station 130.

An advantage of this embodiment is to enable the mobile station 130 to suggest a preferred configuration to the serving first network node no based on its energy status. A further advantage of this embodiment is to enable the mobile station 130 to decide autonomously a (e.g., the best, a preferred, or at least an acceptable) configuration of parameters to monitor network nodes 120 operating in DTX mode based on its current energy status. Thereby, energy savings are enabled with reduced signaling overhead.

In a further embodiment, the at least one energy saving information may indicate an energy status associated with the mobile station 130. In one example, said energy status may be indicated with N binary bits encoding up to 2N energy status. The energy status may be associated, for instance, with the battery charge of the mobile station 130. For instance, N=2 bits may be used to indicate three energy statuses, namely: high, medium, low. In a further example, the energy status may be indicated with a single binary bit, where one value of the bit, such as 0, or alternatively 1, may be used to indicate low energy status, and the second value, i.e. the opposite such as 1 or alternatively 0, may be used to indicate high energy status. One advantage of this embodiment is that signaling of the energy saving information may be made with minimum signaling overhead.

In a further embodiment, the energy saving information transmitted by the mobile station 130 may be associated with a device-to-device operation. The mobile station 130 may report and/or request a preferred configuration of parameters, among a set of preconfigured parameters, associated with the device-to-device operation, such as e.g.: discovering the presence of other mobile stations, monitoring signals transmitted by other mobile stations, synchronizing with signals transmitted by other mobile stations; transmitting/receiving data or control information to/from at least one other mobile station. In one example, the mobile station 130 may transmit energy saving information indicating possible willingness to participate to device-to-device operation based, for instance, on the current energy status of the mobile station 130. For instance, one bit set to a value such as 0, or alternatively 1 may be used to indicate preference to participate in a device-to-device operation. The opposite value of the bit, i.e. 1, or alternatively 0, may indicate declination to participate in such device-to-device operation. In a further example, the mobile station 130 may transmit an indication of self-disabled device-to-device and/or relaying operation or a preference to disable device-to-device and/or relaying operation due to energy saving.

Thereby, the mobile station 130 is enabled to autonomously determine to participate in device-to-device operations or not, based on the current battery level. Thereby is it avoided that the battery is drained by device-to-device operations when energy power instead may be saved for more prioritized and/or urgent actions.

In yet a further embodiment, the first network node 110 may enable and/or control the configuration of sleeping modes of the mobile station 130, such as a discontinuous reception (DRX) mode, discontinuous transmission (DTX) mode, an idle mode, based on the energy saving information associated with said mobile station 130. In one example, the mobile station 130 indicating a low energy status may be configured with longer DRX cycles and/or DTX cycles. In a further example, the energy saving information transmitted by the mobile station 130 to the at least one first network node no may indicate a preferred or accepted configuration of parameters for DRX cycles and/or DTX cycles. In other words, the mobile station 130 may suggest or report a configuration of DRX cycles and/or DTX cycles determined based on its energy status. Similarly, in an LTE system 100 the network control node no may release a connection with the mobile station 130 to trigger an idle mode based on energy saving information received from the mobile station 130. This may happen, for instance, when the mobile station 130 signals a low energy status or a request to disable an RRC connection to the network. Therefore, energy is saved by configuring the appropriate parameters based on the mobile station's information.

In a further embodiment, the first network node no may control the configuration of RRM and/or RLM measurements for the mobile station 130 based on energy saving information received by the mobile station 130. RRM and/or RLM measurements may be associated with one or more operations of: cell search procedure; detection and/or monitoring of at least one other network node (e.g., for handover purposes); detection and/or discovery and/or monitoring of other mobile nodes. In one example, the mobile station 130 indicating a low energy status may be configured with longer measurement gaps (e.g., linger measurement gap repetition time and/or shorter measurement gap length) and/or fewer measurement reports. In a further example, the energy saving information transmitted by the mobile station 130 to the at least one first network node no may indicate a preferred or accepted configuration of parameters for RRM/RLM measurements. In other words, the mobile station 130 may suggest or report configuration parameters associated with RRM/RLM measurements determined based on the energy status of the mobile station 130. Therefore, energy is saved by configuring the appropriate parameters based on the mobile station's information.

In yet another embodiment, the first network control node no may control the configuration of device-to-device operations and/or a relaying operation for the at least one mobile station 130 based on an energy saving information received from said mobile station 130. This implies controlling at least one operation of the mobile station 130 associated with device-to-device operation and/or relaying such as: discovering the presence of other mobile stations, monitoring signals transmitted by other mobile stations, synchronizing to signals transmitted by other mobile stations; transmitting/receiving data or control information to/from at least one other mobile station. The first network node no may determine, how frequently, and/or for how long, and/or in which time-frequency resource, the mobile station 130 is to perform any of the aforementioned operations based on the energy saving information received from said mobile station 130. For instance, the first network node no may control the periodicity and duration of any of detection, discovery, and/or measurements associated with device-to-device operation for the at least one mobile station 130 based on at least an energy saving information received from said mobile station 130. In another example, the first network node no may configure the mobile station 130 to discover and/or monitor and/or communicate with (i.e., transmit a signal to and/or receiving a signal from) a limited number of other mobile stations based on energy saving information received from said mobile station 130. In a further example, device-to-device operation and/or relaying operation at the mobile station 130 is disabled by the first network node 110 based on energy saving information received from said mobile station 130. Therefore, the advantage of this embodiment comprises controlling the energy consumed by the mobile station 130 for device-to-device operations, or relaying operations based on energy saving information received from the mobile station 130.

Figure 4:
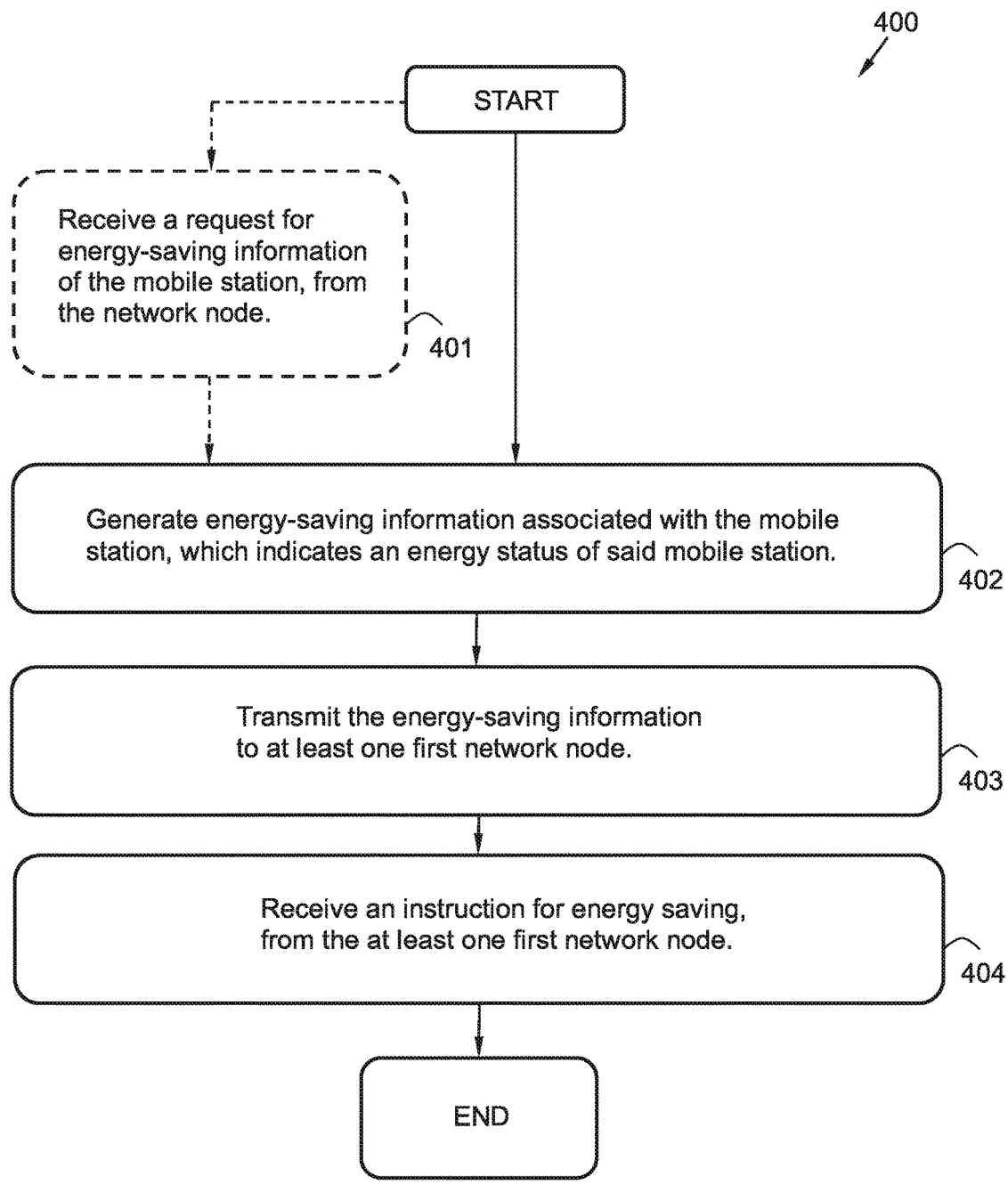
FIG. 4 is a flow chart illustrating a method in a mobile station according to an embodiment.

FIG. 4 is a flow chart illustrating embodiments of a method 400 for use in a mobile station 130. The method 400 aims at saving energy in the mobile station 130. The mobile station 130 may be served by a first network node 110 in a wireless communication system 100 comprising the first network node no and possibly at least one other network node 120. The optional other network node 120 may comprise a set of a plurality of other network nodes 120-0, 120-1, 120-2 in some embodiments. The other network node 120 may operate in DRX mode.

The wireless communication network 100 may be based on 3GPP LTE. Further, the wireless communication system 100 may be based on FDD or TDD in different embodiments. The first network node 110 and/or the other network node 120 may comprise an evolved NodeB (eNodeB) according to some embodiments.

To save energy at the mobile station 130, the method 400 may comprise a number of actions 401-404. It is however to be noted that any, some or all of the described actions 401-404, may be performed in a somewhat different chronological order than the enumeration indicates, be performed simultaneously or even be performed in a completely reversed order according to different embodiments. Also, some actions such as e.g. actions 401 may be performed only within some alternative embodiments. Further, it is to be noted that some actions may be performed in a plurality of alternative manners according to different embodiments, and that some such alternative manners may be performed only within some, but not necessarily all embodiments. The method 400 may comprise the following actions.

Action 401: This action may be performed within some, but not necessarily all embodiments of the method 400.

A request for energy saving information of the mobile station 130 may be received from at least one network node no.

The energy saving information may comprise an energy status associated with the mobile station 130 and/or an energy saving configuration associated with at least one operation of the mobile station 130 in some embodiments.

Action 402: Energy saving information is generated, associated with the mobile station 130, which indicates an energy status of the mobile station 130.

The energy status of the mobile station 130 may comprise an indication of a battery level in some embodiments.

The energy saving information may comprise an energy saving configuration associated with at least one operation of said mobile station 130.

The energy saving information may be associated with monitoring of at least one other network node 120 operating in discontinuous transmission mode, which is distinct from the first network node no, in some embodiments.

Further, the energy saving information may indicate a request or a trigger for an energy saving configuration for at least one operation of said mobile station 130 and/or a notification that the mobile station 130 has entered an energy saving mode in some embodiments.

In some embodiments, the energy saving configuration may comprise at least one of: an energy saving configuration of parameters associated with monitoring of at least one other network node 120 operating in discontinuous transmission mode, which is distinct from the first network node no; a configuration of an energy saving mode of the mobile station 130, particularly to a discontinuous reception mode, a discontinuous transmission mode, a Radio Resource Control idle mode and/or a sleeping mode; a configuration of Radio Resource Management measurements and/or Radio Link Monitoring measurements for the mobile station 130; an energy saving configuration of another mobile station operation, particularly to cell search, cell detection, random access, monitoring of network nodes 110, 120, monitoring and/or discovering other mobile stations and/or configuration of a device-to-device operation.

Action 403: The energy saving information is transmitted to at least one first network node no.

Action 404: An instruction for energy saving is received from the at least one first network node no based on the energy saving information.

The received instruction for energy saving may comprise at least one of: an energy saving configuration of parameters associated with monitoring of at least one other network node 120 operating in discontinuous transmission mode, which is distinct from the first network node no; a configuration of an energy saving mode of the mobile station 130, particularly to a discontinuous reception mode, a discontinuous transmission mode, a Radio Resource Control idle mode and/or a sleeping mode; a configuration of Radio Resource Management measurements and/or Radio Link Monitoring measurements for the mobile station 130; and an energy saving configuration of another mobile station operation, particularly to cell search, cell detection, random access, monitoring of network nodes 110, 120, monitoring and/or discovering other mobile stations and/or configuration of a device-to-device operation in different embodiments.

Figure 5:
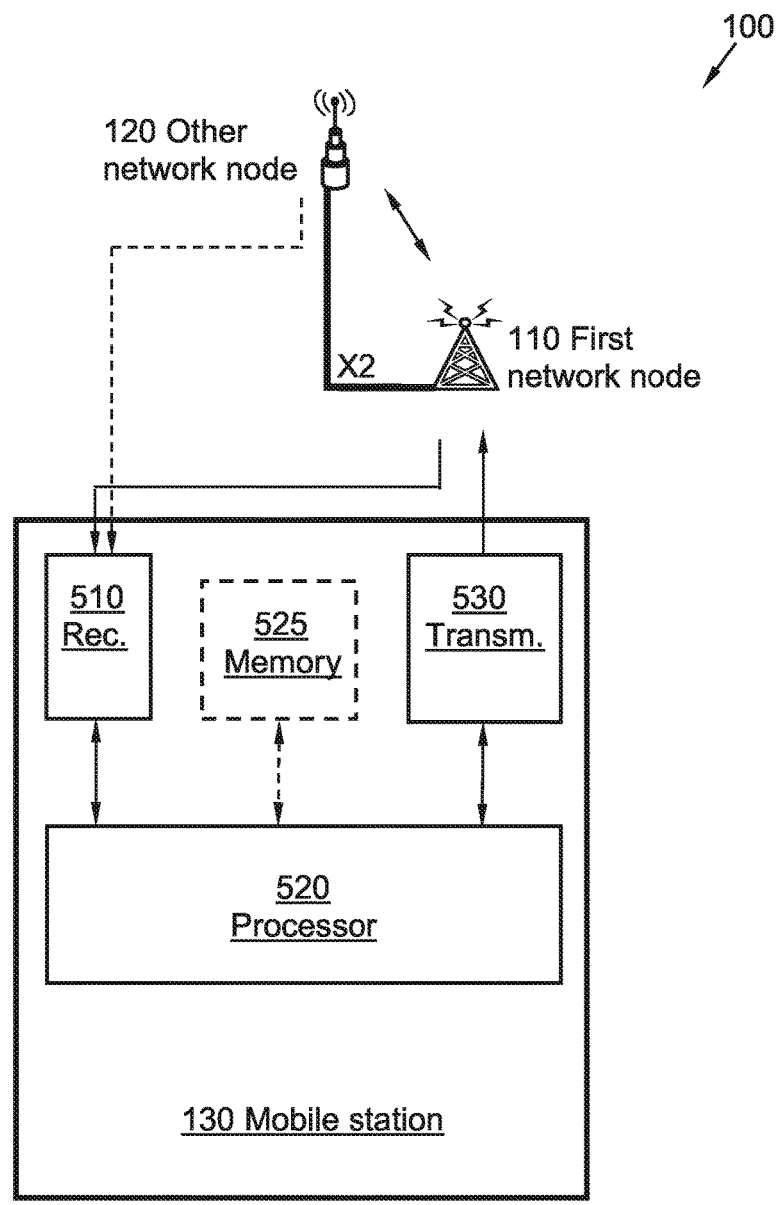
FIG. 5 is a block diagram illustrating a mobile station according to an embodiment.

FIG. 5 illustrates an embodiment of a mobile station 130, configured for wireless communication in a wireless communication system 100. The mobile station 130 is further configured for performing the method 400 according to at least some of the previously described actions 401-404 for saving energy.

The mobile station 130 may be served by a first network node no in a wireless communication system 100 comprising the first network node no and possibly at least one other network node 120. The optional other network node 120 may comprise a set of a plurality of other network nodes 120-0, 120-1, 120-2 in some embodiments. The other network node 120 may operate in DRX mode.

The wireless communication network 100 may be based on 3GPP LTE. Further, the wireless communication system 100 may be based on FDD or TDD in different embodiments. The first network node no and/or the other network node 120 may comprise an evolved NodeB (eNodeB) according to some embodiments.

For enhanced clarity, any internal electronics or other components of the mobile station 130, not completely indispensable for understanding the herein described embodiments have been omitted from FIG. 5.

The mobile station 130 comprises a processor 520, configured for generating energy saving information associated with said mobile station 130, which indicates an energy status of said mobile station 130.

Such processor 520 may comprise one or more instances of a processing circuit, i.e. a Central Processing Unit (CPU), a processing unit, a processing circuit, a processor, an Application Specific Integrated Circuit (ASIC), a microprocessor, or other processing logic that may interpret and execute instructions. The herein utilized expression "processor" may thus represent a processing circuitry comprising a plurality of processing circuits, such as, e.g., any, some or all of the ones enumerated above.

Further, the mobile station 130 comprises a transmitter 510, configured for transmitting the energy saving information to at least one first network node no.

In addition the mobile station 130 comprises a receiver 530, configured for receiving an instruction for energy saving, from the at least one first network node no based on the energy saving information. Thus the receiver is configured for receiving signals from various network nodes 110, 120 and/or the mobile stations over a wireless interface according to some embodiments.

The receiver 530 may in some embodiments be further configured for receiving a request for energy saving information of the mobile station 130, from at least one first network node no.

The energy saving information may further comprise an energy saving configuration associated with at least one operation of the mobile station 130 in some embodiments.

Further, the energy status of said mobile station 130 may comprise an indication of a battery level of the mobile station 130.

In some embodiments, the energy saving configuration may comprise at least one of: an energy saving configuration of parameters associated with monitoring of at least one other network node 120 operating in discontinuous transmission mode, which is distinct from the first network node no; a configuration of an energy saving mode of the mobile station 130, particularly to a discontinuous reception mode, a discontinuous transmission mode, a Radio Resource Control idle mode and/or a sleeping mode; a configuration of Radio Resource Management measurements and/or Radio Link Monitoring measurements for the mobile station 130; an energy saving configuration of another mobile station operation, particularly to cell search, cell detection, random access, monitoring of network nodes 110, 120, monitoring and/or discovering other mobile stations and/or configuration of a device-to-device operation.

The energy saving information may in some embodiments be associated with monitoring of at least one other network node 120 operating in discontinuous transmission mode, which is distinct from the first network node no.

Further, the energy saving information may indicate a request or a trigger for an energy saving configuration for at least one operation of the mobile station 130 and/or a notification that the mobile station 130 has entered an energy saving mode.

The received instruction for energy saving may comprise at least one of: an energy saving configuration of parameters associated with monitoring of at least one other network node 120 operating in discontinuous transmission mode, which is distinct from the first network node no; a configuration of an energy saving mode of the mobile station 130, particularly to a discontinuous reception mode, a discontinuous transmission mode, a Radio Resource Control idle mode and/or a sleeping mode; a configuration of Radio Resource Management measurements and/or Radio Link Monitoring measurements for the mobile station 130; and an energy saving configuration of another mobile station operation, particularly to cell search, cell detection, random access, monitoring of network nodes 110, 120, monitoring and/or discovering other mobile stations and/or configuration of a device-to-device operation in different embodiments.

Furthermore, the mobile station 130 may further comprise at least one memory 525, according to some embodiments. The optional memory 525 may comprise a physical device utilized to store data or programs, i.e., sequences of instructions, on a temporary or permanent basis. According to some embodiments, the memory 525 may comprise integrated circuits comprising silicon based transistors. Further, the memory 525 may be volatile or nonvolatile.

The above described actions 401-404 to be performed in the mobile station 130 may be implemented through the one or more processors 520 in the mobile station 130, together with computer program product for performing at least some of the functions of the actions 401-404. Thus a computer program comprising program code may perform the method 400 according to any, at least some, or all of the functions of the actions 401-404 for saving energy at the mobile station 130, when the computer program is loaded into a processor 520 of the mobile station 130.

Further, a computer program product may comprise a computer readable storage medium storing program code thereon for use by the mobile station 130, for saving energy at the mobile station 130, wherein the program code comprising instructions for executing a method 400 comprising: generating 402 energy saving information associated with said mobile station 130, which indicates an energy status of said mobile station 130; transmitting 403 the energy saving information to at least one first network node 110; and receiving 404 an instruction for energy saving, from said at least one first network node no based on the energy saving information.

The computer program product mentioned above may be provided for instance in the form of a data carrier carrying computer program code for performing at least some of the actions 401-404 according to some embodiments when being loaded into the processor 520. The data carrier may be, e.g., a hard disk, a CD ROM disc, a memory stick, an optical storage device, a magnetic storage device or any other appropriate medium such as a disk or tape that may hold machine readable data in a nontransitory manner. The computer program product may furthermore be provided as computer program code on a server and downloaded to the mobile station 130 remotely, e.g., over an Internet or an intranet connection.

Figure 6:
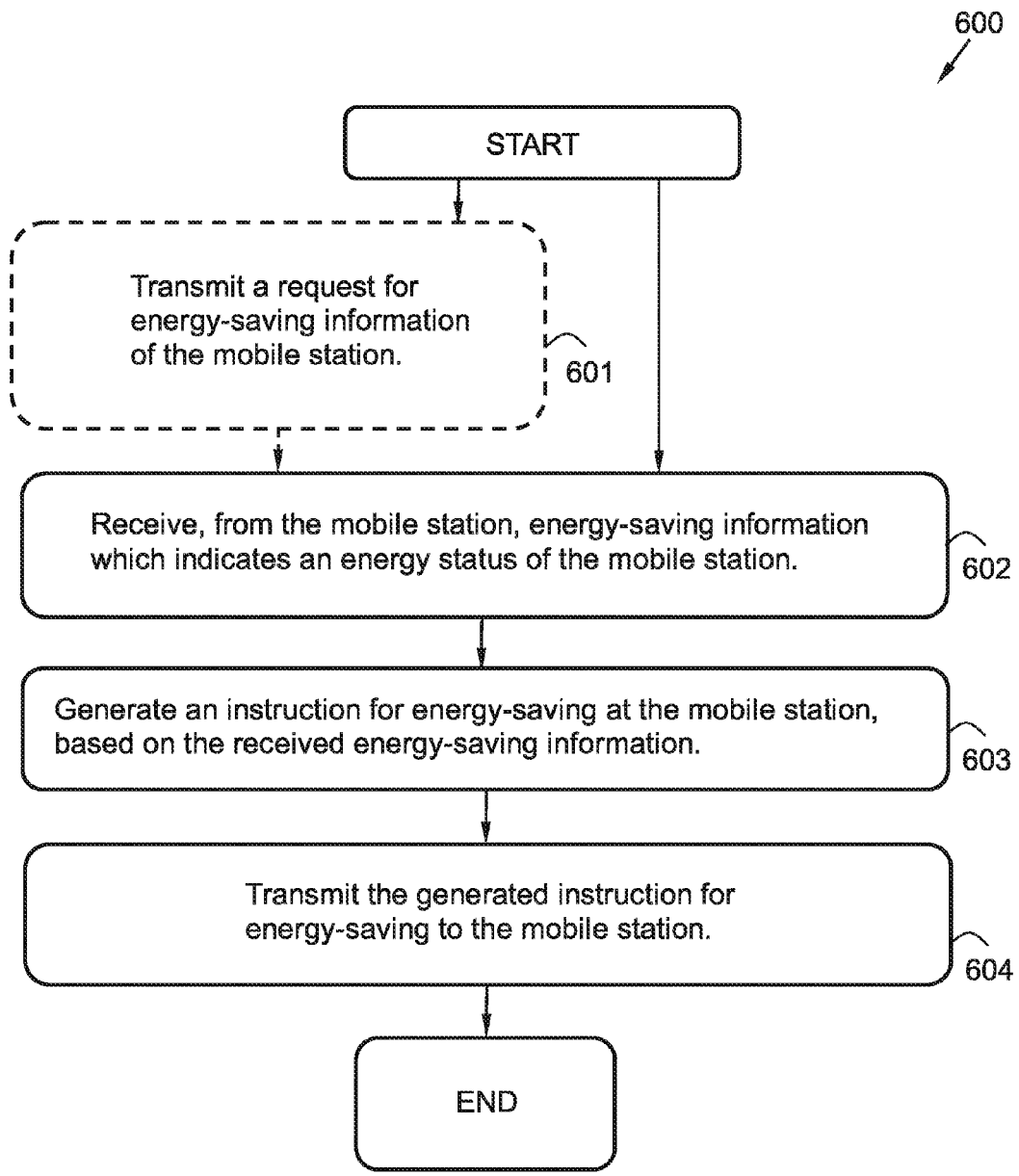
FIG. 6 is a flow chart illustrating a method in a first network node according to an embodiment.

FIG. 6 is a flow chart illustrating embodiments of a method 600 for use in a first network node no for enabling energy saving at a mobile station 130.

To appropriately enable energy saving at the mobile station 130, the method 600 may comprise a number of actions 601-604.

It is however to be noted that any, some or all of the described actions 601-604, may be performed in a somewhat different chronological order than the enumeration indicates, be performed simultaneously or even be performed in a completely reversed order according to different embodiments. Also, some actions such as e.g. action 601 may be performed only within some alternative embodiments. Further, it is to be noted that some actions may be performed in a plurality of alternative manners according to different embodiments, and that some such alternative manners may be performed only within some, but not necessarily all embodiments. The method 600 may comprise the following actions.

Action 601: This action may be performed within some, but not necessarily all possible embodiments.

A request for energy saving information of the mobile station 130 is transmitted to the mobile station 130.

Action 602: Energy saving information is received from the mobile station 130, which indicates an energy status of said mobile station 130.

The energy saving information may comprise an energy saving configuration associated with at least one operation of said mobile station 130.

In some embodiments, the energy saving configuration may comprise at least one of: an energy saving configuration of parameters associated with monitoring of at least one other network node 120 operating in discontinuous transmission mode, which is distinct from the first network node 110. a configuration of an energy saving mode of the mobile station 130, particularly to a discontinuous reception mode, a discontinuous transmission mode, a Radio Resource Control idle mode and/or a sleeping mode; a configuration of Radio Resource Management measurements and/or Radio Link Monitoring measurements for the mobile station 130; an energy saving configuration of another mobile station operation, particularly to cell search, cell detection, random access, monitoring of network nodes 110, 120, monitoring and/or discovering other mobile stations and/or configuration of a device-to-device operation.

The energy status of the mobile station 130 may comprise an indication of a battery level of the mobile station 130.

The energy saving information may be associated with monitoring of at least one other network node 120 operating in discontinuous transmission mode, which is distinct from the first network node no.

Further the energy saving information may indicate a request or a trigger for an energy saving configuration for at least one operation of said mobile station 130 and/or a notification that the mobile station 130 has entered an energy saving mode in some embodiments.

Action 603: An instruction for energy saving at the mobile station 130 is generated, based on the received 602 energy saving information.

Action 604: The generated 603 instruction for energy saving to the mobile station 130 is transmitted to the mobile station 130.

The transmitted instruction for energy saving may comprise at least one of: an energy saving configuration of parameters associated with monitoring of at least one other network node 120 operating in discontinuous transmission mode, which is distinct from the first network node 110, a configuration of an energy saving mode of the mobile station 130, particularly to a discontinuous reception mode, a discontinuous transmission mode, a Radio Resource Control idle mode and/or a sleeping mode, a configuration of Radio Resource Management measurements and/or Radio Link Monitoring measurements for the mobile station 130, and an energy saving configuration of another mobile station operation, particularly to cell search, cell detection, random access, monitoring of network nodes 110, 120, monitoring and/or discovering other mobile stations and/or configuration of a device-to-device operation in different embodiments.

The transmitted signal maybe mobile station specific; or mobile stations group specific in different embodiments.

Furthermore, the signal may be transmitted as part of a physical downlink control channel, such as PDCCH and/or EPDCCH in some embodiments. Also, in some embodiments, the signal may be transmitted by using physical downlink shared channel, such as e.g. PDSCH; or higher layer RRC signaling.

Figure 7:
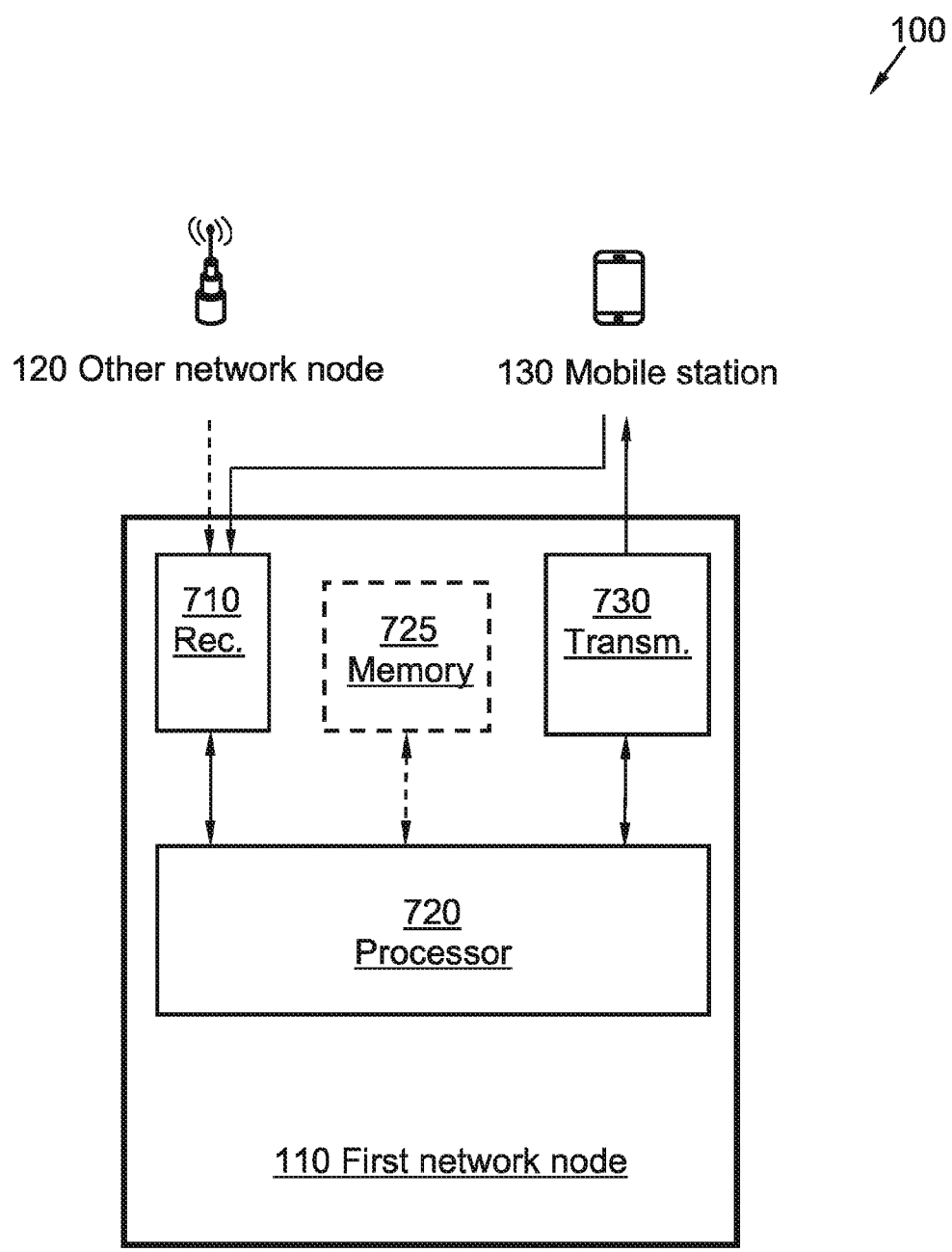
FIG. 7 is a block diagram illustrating a first network node according to an embodiment.

FIG. 7 illustrates an embodiment of a first network node no. The first network node no is configured for performing the method 600 according to at least some of the previously described actions 601-604 for enabling energy savings of a mobile station 130.

For enhanced clarity, any internal electronics or other components of the first network node 110, not completely indispensable for understanding the herein described embodiments have been omitted from FIG. 7.

The first network node no comprises a receiver 710, configured for receiving energy saving information from the mobile station 130, which indicates an energy status of said mobile station 130.

The receiver 710 may be configured for receiving radio signals over a wireless interface. The signals may be received from, e.g., the mobile station 130, other mobile stations, the other network node 120, or any other entity configured for communication within the wireless communication system 100, according to some embodiments.

In addition, the first network node no also comprises a processor 720, configured for generating an instruction for energy saving at the mobile station 130, based on the received energy saving information.

The energy saving information may comprise an energy saving configuration associated with at least one operation of said mobile station 130.

In some embodiments, the energy saving configuration may comprise at least one of: an energy saving configuration of parameters associated with monitoring of at least one other network node 120 operating in discontinuous transmission mode, which is distinct from the first network node 110; a configuration of an energy saving mode of the mobile station 130, particularly to a discontinuous reception mode, a discontinuous transmission mode, a Radio Resource Control idle mode and/or a sleeping mode; a configuration of Radio Resource Management measurements and/or Radio Link Monitoring measurements for the mobile station 130; an energy saving configuration of another mobile station operation, particularly to cell search, cell detection, random access, monitoring of network nodes 110, 120, monitoring and/or discovering other mobile stations and/or configuration of a device-to-device operation.

The energy status of the mobile station 130 may comprise an indication of a battery level of the mobile station 130.

The energy saving information may be associated with monitoring of at least one other network node 120 operating in discontinuous transmission mode, which is distinct from the first network node 110.

Further the energy saving information may indicate a request or a trigger for an energy saving configuration for at least one operation of said mobile station 130 and/or a notification that the mobile station 130 has entered an energy saving mode in some embodiments.

Such processor 720 may comprise one or more instances of a processing circuit, i.e. a Central Processing Unit (CPU), a processing unit, a processing circuit, a processor, an Application Specific Integrated Circuit (ASIC), a microprocessor, or other processing logic that may interpret and execute instructions. The herein utilized expression "processor" may thus represent a processing circuitry comprising a plurality of processing circuits, such as, e.g., any, some or all of the ones enumerated above.

Furthermore, the first network node 110 also comprises a transmitter 730, configured for transmitting a wireless signal e.g. comprising the generated instruction for energy saving to the mobile station 130. The transmitter 730 may be further configured for transmitting a request to the mobile station 130, for energy saving information of the mobile station 130.

The transmitted instruction for energy saving may comprise at least one of: an energy saving configuration of parameters associated with monitoring of at least one other network node 120 operating in discontinuous transmission mode, which is distinct from the first network node 110; a configuration of an energy saving mode of the mobile station 130, particularly to a discontinuous reception mode, a discontinuous transmission mode, a Radio Resource Control idle mode and/or a sleeping mode; a configuration of Radio Resource Management measurements and/or Radio Link Monitoring measurements for the mobile station 130; and an energy saving configuration of another mobile station operation, particularly to cell search, cell detection, random access, monitoring of network nodes 110, 120, monitoring and/or discovering other mobile stations and/or configuration of a device-to-device operation in different embodiments.

The transmitted signal maybe mobile station specific; or mobile stations group specific in different embodiments.

Furthermore, the signal may be transmitted as part of a physical downlink control channel, such as PDCCH and/or EPDCCH in some embodiments. Also, in some embodiments, the signal may be transmitted by using physical downlink shared channel, such as e.g. PDSCH; or higher layer RRC signaling.

Furthermore, the first network node no may further comprise at least one memory 725, according to some embodiments. The optional memory 725 may comprise a physical device utilized to store data or programs, i.e., sequences of instructions, on a temporary or permanent basis. According to some embodiments, the memory 725 may comprise integrated circuits comprising silicon based transistors. Further, the memory 725 may be volatile or nonvolatile.

The above described actions 601-604 to be performed in the first network node no may be implemented through the one or more processors 720 in the first network node no, together with computer program product for performing at least some of the functions of the actions 601-604. Thus a computer program product, comprising instructions for performing the actions 601-604 in the first network node no may perform a method 600 comprising at least some of the method actions 601-604, for enabling energy saving at a mobile station 130, when the computer program is loaded into a processor 720 of the first network node no.

Thus a computer program product comprising a computer readable storage medium storing program code thereon for use by a first network node no for enabling energy saving at a mobile station 130, wherein the program code comprising instructions for executing a method 600 comprising: receiving 602, from the mobile station 130, energy saving information which indicates an energy status of said mobile station 130; generating 603 an instruction for energy saving at the mobile station 130, based on the received 602 energy saving information; and transmitting 604 the generated 603 instruction for energy saving to the mobile station 130.

The computer program product mentioned above may be provided for instance in the form of a data carrier carrying computer program code for performing at least some of the actions 601-604 according to some embodiments when being loaded into the processor 720 of the first network node 110. The data carrier may be, e.g., a hard disk, a CD ROM disc, a memory stick, an optical storage device, a magnetic storage device or any other appropriate medium such as a disk or tape that may hold machine readable data in a nontransitory manner. The computer program product may furthermore be provided as computer program code on a server and downloaded to the first network node 110 remotely, e.g., over an Internet or an intranet connection.

The terminology used in the description of the embodiments as illustrated in the accompanying drawings is not intended to be limiting of the described methods 400, 600; first network node 110 and/or mobile station 130. Various changes, substitutions and/or alterations may be made, without departing from the invention as defined by the appended claims.

As used herein, the term "and/or" comprises any and all combinations of one or more of the associated listed items. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as e.g. a processor may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid state medium supplied together with or as part of other hardware, but may also be distributed in other forms such as via Internet or other wired or wireless communication system.

What is claimed is:

1. A mobile station, comprising:
  a processor;
  a non-transitory computer-readable storage medium storing a program to be executed by the processor, the program including instructions for:
  generating energy saving information associated with said mobile station, wherein said energy saving information comprises an indication of an energy status of said mobile station and information associated with at least one operation of said mobile station;
  a transmitter, configured for transmitting the energy saving information to at least one first network node; and
  a receiver, configured for receiving an energy saving instruction, from said at least one first network node based on the energy saving information, wherein the energy saving instruction comprises:
    an energy saving configuration of parameters associated with monitoring of at least one other network node operating in discontinuous transmission mode, which is distinct from the first network node;
    a configuration of an energy saving mode of the mobile station, particularly to a discontinuous reception mode, a discontinuous transmission mode, a Radio Resource Control idle mode, or a sleeping mode;
    a configuration of Radio Resource Management measurements or Radio Link Monitoring measurements for the mobile station; and
    an energy saving configuration of another mobile station operation, wherein said another mobile station operation comprises a cell search operation, a cell detection operation, a random access operation, monitoring of network nodes, monitoring or discovering other mobile stations, or configuration of a device-to-device operation.

2. The mobile station according to claim 1, wherein the energy status of said mobile station comprises an indication of a battery level.

3. The mobile station according to claim 1, wherein the energy saving information further comprises a request for an energy saving configuration associated with at least one operation of said mobile station.

4. The mobile station according to claim 3, wherein the configuration of the energy saving mode is a configuration causing the mobile station to enter the discontinuous reception mode, the discontinuous transmission mode, the Radio Resource Control idle mode, or the sleeping mode.

5. The mobile station according to claim 1, wherein the receiver is further configured for receiving a request for energy saving information of the mobile station from at least one first network node.

6. The mobile station according to claim 1, wherein said energy saving information is associated with monitoring of at least one other network node operating in discontinuous transmission mode, and which is distinct from the first network node.

7. The mobile station according to claim 1, wherein said energy saving information further indicates a trigger for an energy saving configuration for at least one operation of said mobile station, or a notification that the mobile station has entered an energy saving mode.

8. A method, comprising:
  generating energy saving information associated with a mobile station, wherein said energy saving information comprises an indication of an energy status of said mobile station and information associated with at least one operation of said mobile station;
  transmitting the energy saving information to at least one first network node; and
  receiving an energy saving instruction, from said at least one first network node based on the energy saving information, wherein the energy saving instruction comprises:
    an enemy saving configuration of parameters associated with monitoring of at least one other network node operating in discontinuous transmission mode, which is distinct from the first network node;
    a configuration of an energy saving mode of the mobile station, particularly to a discontinuous reception mode, a discontinuous transmission mode, a Radio Resource Control idle mode, or a sleeping mode;
    a configuration of Radio Resource Management measurements or Radio Link Monitoring measurements for the mobile station; and
    an energy saving configuration of another mobile station operation, wherein said another mobile station operation comprises a cell search operation, a cell detection operation, a random access operation, monitoring of network nodes, monitoring or discovering other mobile stations, or configuration of a device-to-device operation.

9. The method according to claim 8, further comprising:
  receiving a request for energy saving information of the mobile station, from at least one network node.

10. The method according to claim 8, wherein the energy saving information further comprises a request for an energy saving configuration associated with at least one operation of said mobile station.

11. The method according to claim 10, wherein the configuration of the energy saving mode is a configuration causing the mobile station to enter the discontinuous reception mode, the discontinuous transmission mode, the Radio Resource Control idle mode, or the sleeping mode.

12. A first network node, comprising:
  a receiver, configured for receiving energy saving information from a mobile station, wherein said energy saving information comprises an indication of an energy status of said mobile station and information associated with at least one operation of said mobile station;
  a processor, configured for generating an energy saving instruction at the mobile station, based on the energy saving information, wherein the energy saving instruction comprises:
    an energy saving configuration of parameters associated with monitoring of at least one other network node operating in discontinuous transmission mode, which is distinct from the first network node;
    a configuration of an energy saving mode of the mobile station, particularly to a discontinuous reception mode, a discontinuous transmission mode, a Radio Resource Control idle mode, or a sleeping mode;
    a configuration of Radio Resource Management measurements or Radio Link Monitoring measurements for the mobile station; and
    an energy saving configuration of another mobile station operation, wherein said another mobile station operation comprises a cell search operation, a cell detection operation, a random access operation, monitoring of network nodes, monitoring or discovering other mobile stations, or configuration of a device-to-device operation; and
  a transmitter, configured for transmitting the energy saving instruction to the mobile station.

13. The first network node according to claim 12, wherein the transmitter is further configured for transmitting a request to the mobile station for energy saving information of the mobile station.

14. The first network node according to claim 12, wherein the energy saving instruction comprises an energy saving configuration associated with at least one operation of said mobile station.

15. The first network node according to claim 14, wherein the configuration of the energy saving mode is a configuration causing the mobile station to enter the discontinuous reception mode, the discontinuous transmission mode, the Radio Resource Control idle mode, or the sleeping mode.

16. A method, comprising:
  receiving energy saving information at a first network node from a mobile station, wherein said energy saving information comprises an indication of an energy status of said mobile station and information associated with at least one operation of said mobile station;
  generating an energy saving instruction at the mobile station, based on the energy saving information, wherein the energy saving instruction comprises:
    an energy saving configuration of parameters associated with monitoring of at least one other network node operating in discontinuous transmission mode, which is distinct from the first network node;
    a configuration of an energy saving mode of the mobile station, particularly to a discontinuous reception mode, a discontinuous transmission mode, a Radio Resource Control idle mode, or a sleeping mode;
    a configuration of Radio Resource Management measurements or Radio Link Monitoring measurements for the mobile station; and
    an energy saving configuration of another mobile station operation, wherein said another mobile station operation comprises a cell search operation, a cell detection operation, a random access operation, monitoring of network nodes, monitoring or discovering other mobile stations, or configuration of a device-to-device operation; and
  transmitting the energy saving instruction to the mobile station.

17. The method according to claim 16, further comprising:
  transmitting, to the mobile station, a request for energy saving information of the mobile station.

18. The method according to claim 16, wherein the energy saving information further comprises a request for an energy saving configuration associated with at least one operation of said mobile station.

19. The method according to claim 18, wherein the configuration of the energy saving mode is a configuration causing the mobile station to enter the discontinuous reception mode, the discontinuous transmission mode, the Radio Resource Control idle mode, or the sleeping mode.

* * * * *

UNITED STATES PATENT AND TRADEMARK OFFICE
CERTIFICATE OF CORRECTION

PATENT NO. : 10,285,132 B2
APPLICATION NO. : 15/270849
DATED : May 7, 2019
INVENTOR(S) : Pablo Soldati Page 1 of 1

It is certified that error appears in the above-identified patent and that said Letters Patent is hereby corrected as shown below:

In the Claims

In Column 29, Line 21, Claim 8, delete "enemy" and insert --energy--.

Signed and Sealed this
Second Day of July, 2019

Andrei Iancu
*Director of the United States Patent and Trademark Office*